(12) United States Patent
Fukunaga

(10) Patent No.: US 7,177,959 B2
(45) Date of Patent: Feb. 13, 2007

(54) INFORMATION SIGNAL PROCESSING APPARATUS AND METHOD

(75) Inventor: Koji Fukunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 09/816,458

(22) Filed: Mar. 26, 2001

(65) Prior Publication Data

US 2001/0028656 A1 Oct. 11, 2001

(30) Foreign Application Priority Data

Mar. 28, 2000 (JP) .............................. 2000-089302

(51) Int. Cl.
G06F 3/00 (2006.01)
G06F 13/00 (2006.01)
G06F 13/14 (2006.01)
G06F 13/36 (2006.01)

(52) U.S. Cl. ............................. 710/18; 710/17; 710/19; 710/301; 710/302

(58) Field of Classification Search .................... 710/5, 710/6, 8, 62, 63, 69, 15–19, 36, 311, 300–306; 709/221
See application file for complete search history.

(56) References Cited

U.S. PATENT DOCUMENTS

| | | | | |
|---|---|---|---|---|
| 6,233,611 B1 * | 5/2001 | Ludtke et al. | ................ | 710/8 |
| 6,327,637 B1 * | 12/2001 | Chang | ........................ | 710/305 |
| 6,477,589 B1 * | 11/2002 | Suzuki et al. | ................ | 710/18 |
| 6,522,654 B1 * | 2/2003 | Small | ........................ | 709/221 |
| 2002/0065950 A1 * | 5/2002 | Katz et al. | .................. | 709/318 |

* cited by examiner

Primary Examiner—Kim Huynh
Assistant Examiner—Joshua D Schneider
(74) Attorney, Agent, or Firm—Fitzpatrick, Cella, Harper & Scinto

(57) ABSTRACT

An information signal processing apparatus connected to a connection control network, has event reception instrument for receiving a predetermined event instruction irrespective of the type of high level protocol, and when the event reception instrument receives an event instruction, an event corresponding to the received instruction is generated.

11 Claims, 31 Drawing Sheets

FIG. 7

CSR CORE REGISTER

| OFFSET (HEXADECIMAL) | REGISTER NAME | FUNCTION |
|---|---|---|
| 000 | STATE_CLEAR | INFORMATION OF STATUS AND CONTROL |
| 004 | STATE_SET | INFORMATION INDICATING WRITE ENABLE/DISABLE OF STATE_CLEAR |
| 008 | NODE_IDS | BUS ID + NODE ID |
| 00C | RESET_START | RESET BUS BY WRITE IN THIS AREA |
| 010~014 | INDIRECT_ADDRESS, INDIRECT_DATA | REGISTER FOR ACCESSING ROM LARGER THAN 1K |
| 018~01C | SPLIT_TIMEOUT | VALUE OF TIMER FOR DETECTING TIME-OUT OF SPLIT TRANSACTION |
| 020~02C | ARGUMENT, TEST_START, TEST_STATUS | DIAGNOSIS REGISTER |
| 030~04C | UNITS_BASE, UNITS_BOUND, MEMORY_BASE, MEMORY_BOUND | NOT USED IN IEEE1394 |
| 050~054 | INTERRUPT_TARGET, INTERRUPT_MASK | INTERRUPT INDICATION REGISTER |
| 058~07C | CLOCK_VALUE, CLOCK_TICK_PERIOD, CLOCK_STOROBE_ARRIVED, CLOCK_INFO | NOT USED IN IEEE1394 |
| 080~0FC | MESSAGE_REQUEST, MESSAGE_RESPONSE | MESSAGE INDICATION REGISTER |
| 100~17C | | RESERVED |
| 180~1FC | ERROR_LOG_BUFFER | RESERVED FOR IEEE1394 |

FIG. 8

SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER ASSOCIATED WITH POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE BANDWIDTH OF ISOCHRONOUS TRANSFER |
| 224~228 | CHANNELS_AVAILABLE | MANAGE CHANNEL NUMBER OF ISOCHRONOUS TRANSFER |
| 22C | MAINT_CONTROL | DIAGNOSIS REGISTER |
| 230 | MAINT_UTILITY | |
| 234~3FC | | RESERVED |

CONFIGURATION ROM OF MINIMAL FORMAT

FIG. 11

SERIAL BUS DEVICE REGISTER

| OFFSET (HEXADECIMAL) | REGISTER NAME | FUNCTION |
|---|---|---|
| 800~FFC | | RESERVED |
| 1000~13FC | TOPOLOGY_MAP | CONFIGURATION INFORMATION OF SERIAL BUS |
| 1400~1FFC | | RESERVED |
| 2000~2FFC | SPEED_MAP | INFORMATION OF TRANSFER RATE OF SERIAL BUS |
| 3000~FFFC | | RESERVED |

CABLE SECTIONAL VIEW

EX-OR SIGNAL OF DATA AND STROBE

REQUEST RIGHT TO USE BUS

PERMIT RIGHT TO USE BUS

PACKET OF ISOCHRONOUS DATA

FIG. 26

SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER ASSOCIATED WITH POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE TRANSFER OF BUS MANAGER |
| 220 | BANDWIDTH_AVAILABLE | MANAGE BANDWIDTH OF ISOCHRONOUS TRANSFER |
| 224~228 | CHANNELS_AVAILABLE | MANAGE CHANNEL NUMBER OF ISOCHRONOUS TRANSFER |
| 22C | MAIN_CONTROL | DIAGNOSIS REGISTER |
| 230 | MAIN_UTILITY | |
| 234~23C | | RESERVED |
| 240 | REMOTE_BUS_RESET | INDICATE BUS RESET IN REMOTE BUS |
| 244 | EVENT_CONTROL | MANAGE EVENTS |

BEEP = 0 NOT BEEP
       1 CONTINUOUSLY BEEP
       2 INTERMITTENTLY BEEP

LIGHT = 0 NOT EMIT LIGHT
        1 EMIT LIGHT
        2 FLICKER

POWER = 0 NOT CONTROL
         1 TURN ON POWER SUPPLY
         2 TURN OFF POWER SUPPLY

INFORMATION SIGNAL PROCESSING APPARATUS AND METHOD

FIELD OF THE INVENTION

The present invention relates to an information signal processing apparatus connected to a communication control network and an information signal processing method and, more particularly, to an information signal processing apparatus connected to a communication control bus complying with IEEE1394, and an information signal processing method.

BACKGROUND OF THE INVENTION

A serial bus interface such as IEEE1394 allows simultaneous connection of a plurality of devices, e.g., a digital video device (DV), digital camera device (DC), host computer, scanner, VTR, and the like unlike a Centronics parallel interface that connects one host computer and one terminal (device), and a data communication network system and home network by connecting these devices have been proposed by, e.g., the IEEE1394 standard as one of serial bus standards.

Various devices can be connected to these networks, and unspecified many devices of different manufacturers may be connected.

According to IEEE1394-1995, a maximum of 63 nodes can be connected to a single 1394 compatible bus (to be referred to as a "local bus" hereinafter) by a serial address designation method complying with IEEE1394. When a 10-bit address space is defined to designate a bus ID that specifies a bus, 1,023 buses can be interconnected. In a cable environment, the maximum length of a cable between neighboring information signal processing devices (to be referred to as "nodes" hereinafter) that form respective devices is 4.5 m.

In order to eliminate technical limitations encountered upon connecting more than 63 devices that can be connected in maximum by IEEE1394, or upon interconnecting a plurality of IEEE1394 buses at remote places, a device called "1394 bridge" is normally used. When a plurality of IEEE1394 local buses are connected to each other via the 1394 bridge, devices connected to different local buses can make data communications.

In case of IEEE1394, when the bus configuration has changed by, e.g., an increase/decrease in the number of nodes upon insertion/removal of a device node, upon ON/OFF of a power supply, or the like, launch by hardware detection resulting from network abnormality, a direct command from a protocol under the host control, or the like, and a new network configuration need be recognized, each node that has detected such change sends a bus reset signal onto the bus, thus executing a mode for recognizing a new network configuration.

The bus reset signal is transferred to another node on the local bus, and after all the nodes finally detect the bus reset signal, a bus reset is launched. When a bus reset is launched, data transfer is temporarily suspended, and is restarted under a new network configuration after the completion of the bus reset.

On the other hand, in case of a device connected to the IEEE1394 bus, the physical layer and data link layer in a transfer protocol are specified by IEEE1394, but as for higher level layers, various higher level protocols are defined and implemented in correspondence with specific purposes of devices and applications involved.

These higher level protocols of IEEE1394 specify a connection establishment method upon making a data communication with a specific device using the IEEE1394 bus, a resource management method, an application data exchange method, a connection abortion method upon completion of data transfer, a recovery method from an error state and a recovery method upon bus reset as a feature of IEEE1394, and understandings of protocols before and after the bus reset.

In case of DPP (Direct Print Protocol) as an example of higher level protocols, the following mechanism is specified. That is, when a bus reset has occurred, a device that has established a connection issues a reset command at the beginning of data transfer, and the other device sends a confirmation response after reception of that command, thus restarting data transfer.

The AV/C protocol has an understanding that when a bus reset has occurred before a node, which received an AV/C command issued by another node, outputs a response, the command itself is aborted, and a node that issued the command must not expect to receive any response.

In this manner, upon IEEE1394 bus reset, since data transfer is temporarily interrupted, and the topology before and after a bus reset changes, higher level protocol layers must cope with such change in situation, and measures for both the data sending and receiving sides upon bus reset have been specified in the protocol standard. In this way, when a bus reset has occurred, since the data sending and receiving sides execute specified appropriate processes in data transfer between devices having identical higher level protocols before and after a bus reset, data transfer can be continued without being influenced by a bus reset.

However, a plurality of different or identical types of devices may be connected to a single bus using IEEE1394. It is difficult for the user to specify a device he or she wants to use in an environment in which a plurality of such devices are connected. Even when such devices are displayed on the screen, since there are a plurality of identical devices and the user cannot easily recognize a line connection state, it is often difficult to intuitively detect a device the user wants to use.

Such problem can be solved using a high level protocol. However, a high level protocol can issue a specific event to a specific device by specifying such operation, but another protocol has no such specification, no event can be added in the already settled protocol, or such operation itself is not available. As a result, some operation can be made by a given protocol but cannot be made by another protocol.

Such problems similarly occur in networks other than those complying with IEEE1394.

SUMMARY OF THE INVENTION

The present invention has been made to solve the aforementioned problems, and comprises the following arrangement as means for solving the aforementioned problems.

More specifically, an information signal processing apparatus connected to a connection control network, comprises event reception means for receiving a predetermined event instruction irrespective of a type of high level protocol, and when the event reception means receives an event instruction, an event corresponding to the received instruction is generated.

For example, the communication control network uses a communication control bus complying with IEEE1394.

For example, the event reception means uses predetermined addresses as registers, which are allocated in a core CSR architecture register space in an address space of the information signal processing apparatus connected to the communication control bus complying with IEEE1394.

For example, the event reception means uses predetermined addresses as registers, which are allocated in a serial bus register space in an address space of the information signal processing apparatus connected to the communication control bus complying with IEEE1394.

For example, the apparatus further comprises informing means for informing a user of the event.

For example, the event instruction includes one of an event instruction for controlling not to beep, an event instruction for controlling to continuously beep, and an event instruction for controlling to intermittently beep. Alternatively, the event instruction includes one of an event instruction for controlling not to emit light, an event instruction for controlling to continuously emit light, and an event instruction for controlling to flicker. Alternatively, the event instruction includes one of an event instruction for controlling not to execute power supply control, an event instruction for controlling to turn on a power supply, and an event instruction for controlling to turn off the power supply.

According to another aspect of the present invention, a signal processing method in an information signal processing apparatus connected to a connection control network, comprises the step of:

generating, upon receiving an instruction for a predetermined event, an event corresponding to the received instruction irrespective of a type of high level protocol.

According to still another aspect of the present invention, a program makes a computer connected to a connection control network function as:

event reception means for receiving a predetermined event instruction irrespective of a type of high level protocol; and means for, when the event reception means receives an event instruction, generating an event corresponding to the received instruction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a table showing an example of the addresses and functions of information stored in a CSR core register of this embodiment;

FIG. 8 is a table showing an example of the addresses and functions of information stored in a serial bus register of this embodiment;

FIG. 11 is a table showing an example of the addresses and functions of information stored in a serial bus device register of a unit space of this embodiment;

FIG. 26 shows a serial bus-related register area of the 1394 node of this embodiment;

DETAILED DESCRIPTION OF THE PREFERRED EMBODIMENTS

Preferred embodiments of the present invention will now be described in detail in accordance with the accompanying drawings.

Figure 1:
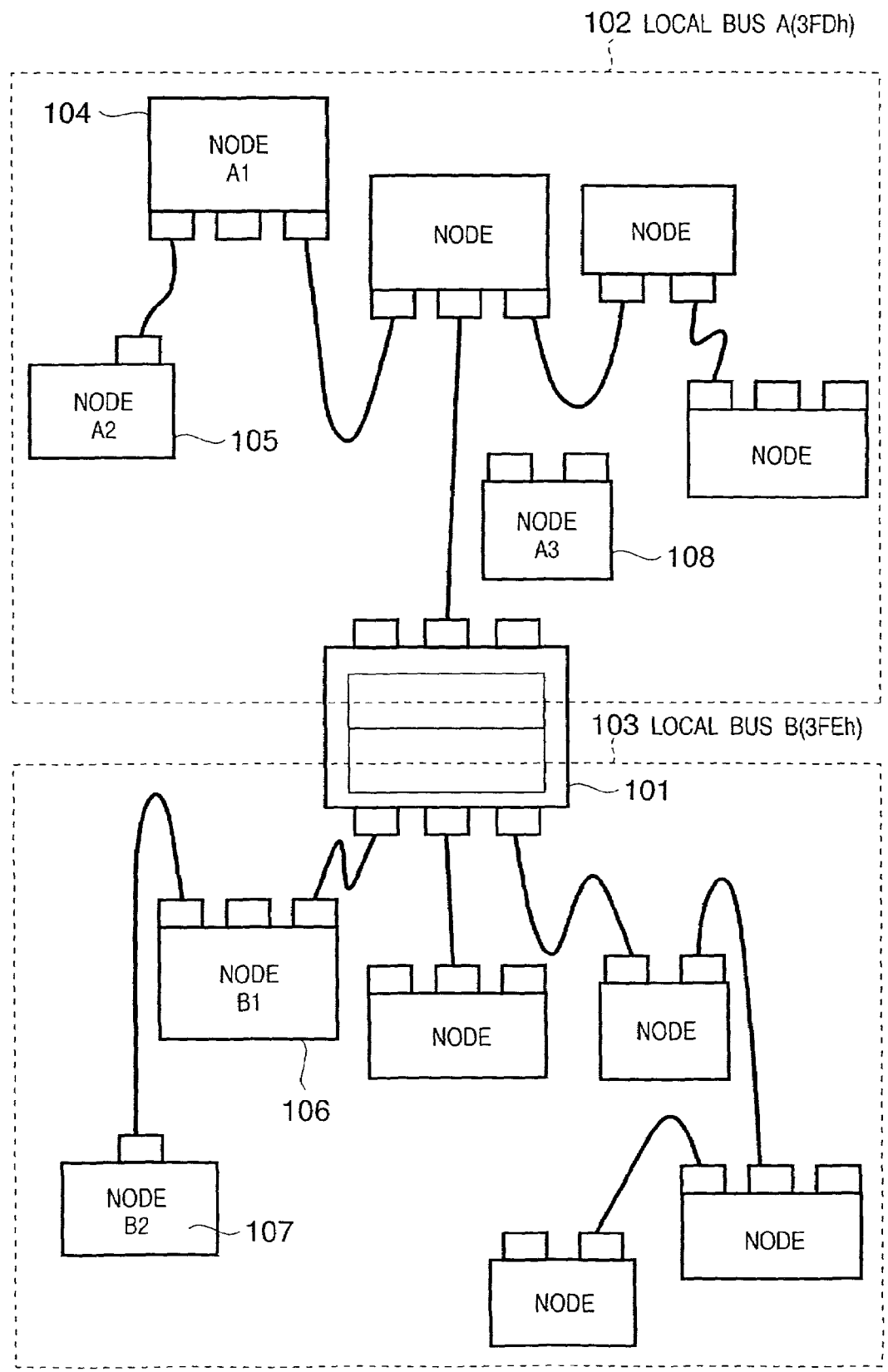
FIG. 1 is a schematic diagram showing the arrangement according to an embodiment of the present invention.

FIG. 1 shows a schematic arrangement according to an embodiment of the present invention, and a network comprises two local buses A 102 and B 103 which comply with IEEE1394, and a 1394 bridge device 101 that connects these buses. In the example of FIG. 1, two local buses are connected, but three or more local buses can be connected via the 1394 bridge device.

A bus ID as bus specifying information for specifying a local bus is assigned to each local bus. A plurality of device nodes are connected to each of the local bus A 102 specified by bus ID="3FDh" and the local bus B 103 specified by bus ID="3FEh".

In the embodiment shown in FIG. 1, for example, a node A1 (104) connected to the local bus A 102 is a digital still camera, and a node A2 (105) is a digital video camcorder. A node B1 (106) connected to the local bus B 103 is a printer, and a node B2 (107) is a digital video camcorder.

The node A1 (104) is installed with the Direct Print Protocol (DPP) specified in advance as a high level protocol, and the node A2 (105) is installed with the AV/C protocol specified in advance.

Likewise, the node B1 (106) connected to the local bus B 103 is installed with a print protocol (Direct Print Protocol) as a high level protocol, and the node B2 (107) is installed with the AV/C protocol.

<Technical Outline of IEEE1394 Standard>

The technique of the IEEE1394-1995 standard applied to a digital interface of this embodiment shown in FIG. 1 will be briefly described below. Details of the IEEE1394-1995 standard (to be referred to as "IEEE1394 standard" hereinafter are described in "IEEE Standard For a High Performance Serial Bus" published by IEEE (The Institute of Electrical and Electronics Engineers, Inc.) on Aug. 30, 1996.

(1) Outline

Figure 2:
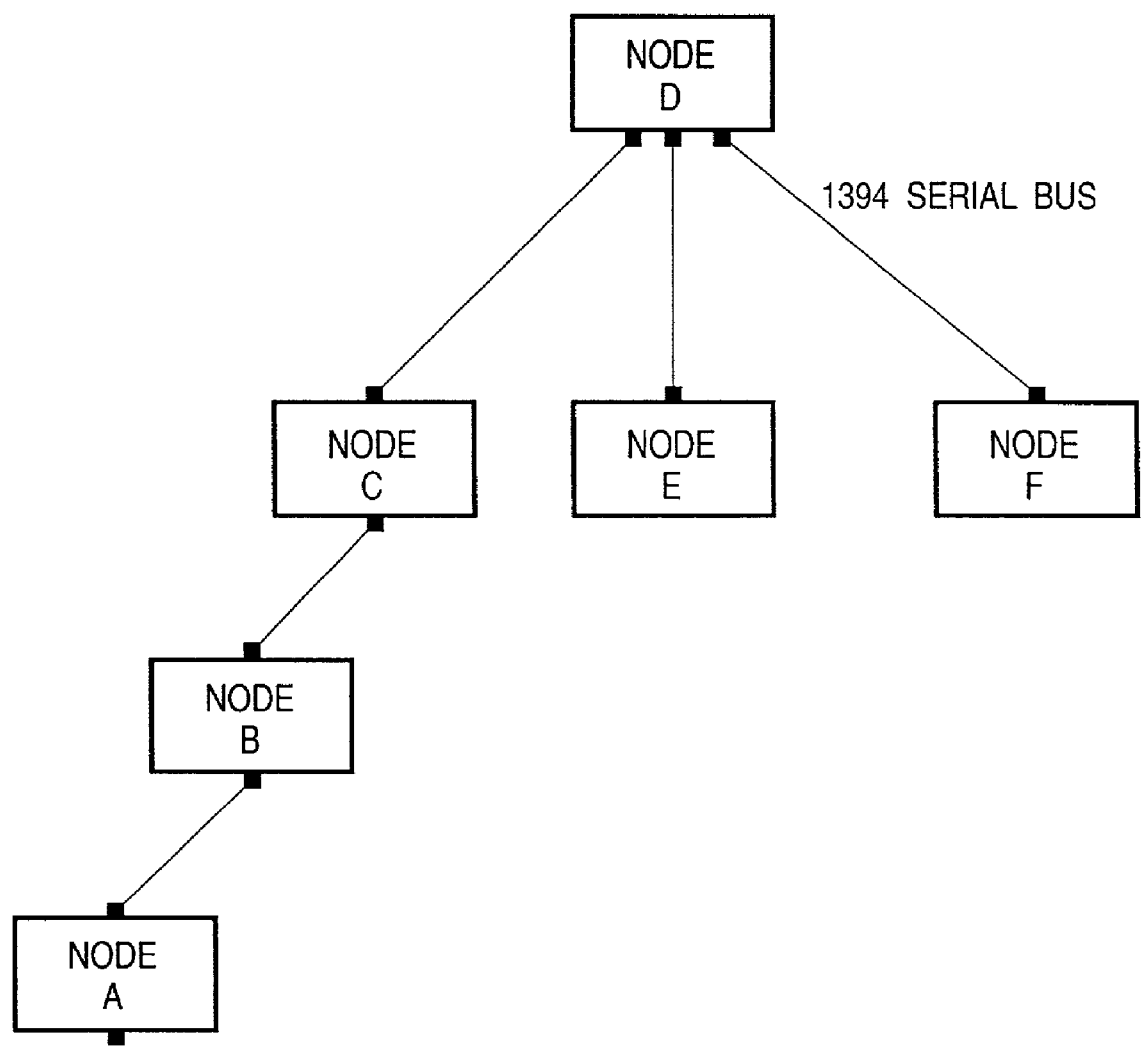
FIG. 2 is a diagram showing an example of the arrangement of a 1394 network of this embodiment.

FIG. 2 shows an example of a communication system (to be referred to as a "1394 network" hereinafter) which is built by nodes comprising digital interfaces (to be referred to as 1394 interfaces) complying with the IEEE1394 standard. The 1394 network forms a bus type network that can communicate serial data.

In FIG. 2, nodes A to H are connected via communication cables complying with the IEEE1394 standard. These nodes A to H are, for example, electronic devices such as a PC (personal computer), digital VTR (Video Tape Recorder), DVD (Digital Video Disc) player, digital camera, hard disk, monitor, and the like.

The connection scheme of the 1394 network includes a daisy-chain scheme and node branch scheme, and has high degree of freedom in connection.

In the 1394 network, for example, when an existing device is removed, a new device is added, or the power switch of an existing device is turned on/off, a bus reset is automatically executed. By executing the bus reset, the 1394 network can automatically recognize a new connection configuration, and can automatically assign ID information to respective devices. With this function, the 1394 network can always recognize the connection configuration of the network.

The 1394 network has a function of relaying data transferred from another device. With this function, all devices can recognize the operation state of the bus.

The 1394 network has a Plug & Play function. With this function, a device can be automatically recognized by only connecting it without turning off the power switches of all the devices.

The 1394 network is compatible to data transfer rates of 100/200/400 Mbps. Since a device having a higher data transfer rate can support a lower data transfer rate, devices corresponding to different data transfer rates can be connected to each other.

Furthermore, the 1394 network is compatible to two different data transfer modes, i.e., asynchronous transfer mode and isochronous transfer mode.

The asynchronous transfer mode is effective when data is required to be asynchronously transferred as needed (i.e., a control signal, file data, or the like). The isochronous transfer mode is effective when data of a given size is required to be continuously transferred at a constant data rate (i.e., video data, audio data, or the like).

The asynchronous and isochronous transfer modes can mix within one communication cycle (normally, one cycle=125 μs). Each transfer mode is executed after a cycle start packet (to be abbreviated as CSP hereinafter) indicating the start of a cycle is transferred.

Note that the isochronous transfer mode has higher priority than the asynchronous transfer mode during each communication cycle period. The transfer frequency band of the isochronous transfer mode is guaranteed within each communication cycle.

(2) Architecture

Figure 3:
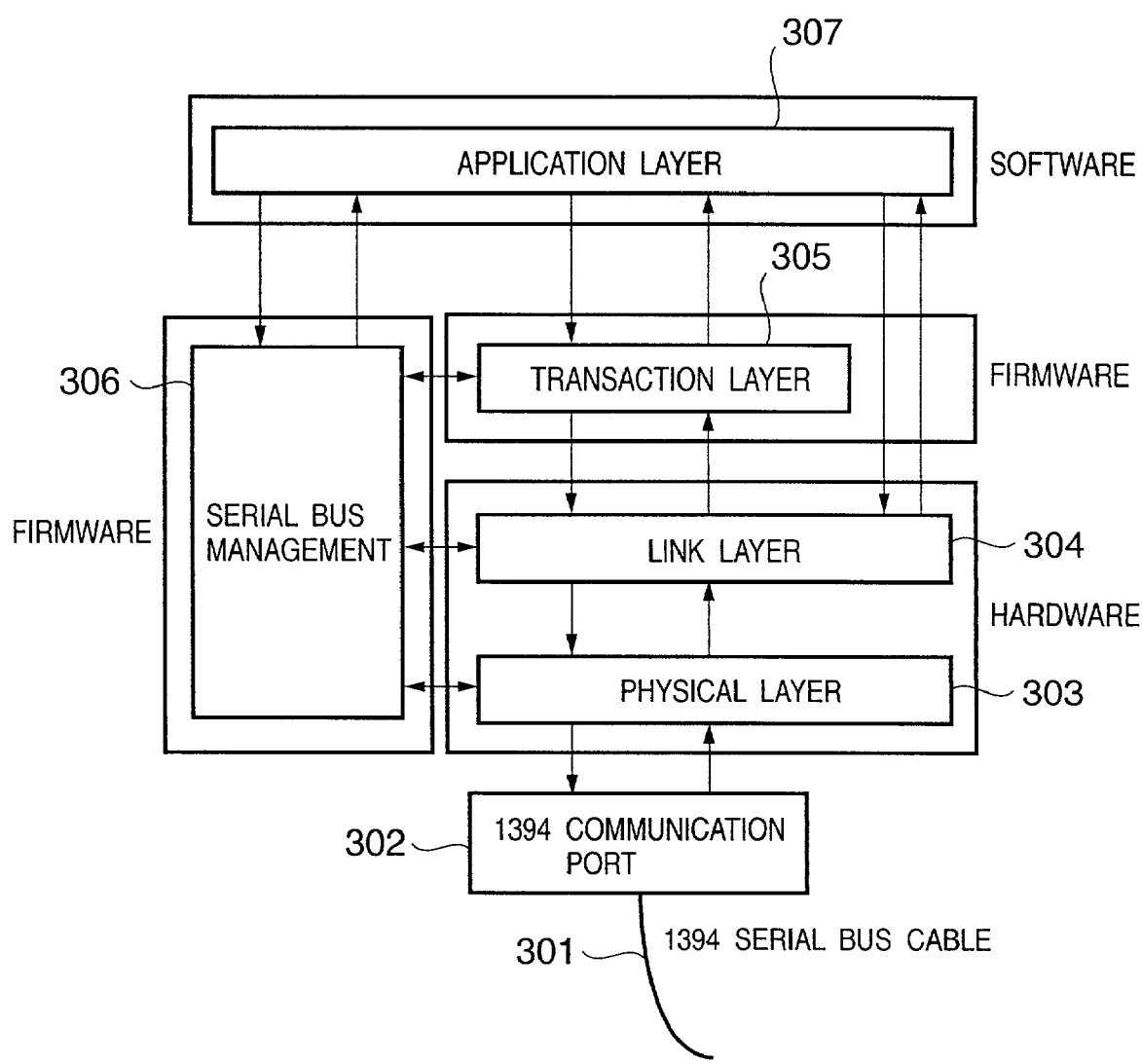
FIG. 3 is a diagram for explaining the architecture of the IEEE1394 standard of this embodiment.

The architecture of the IEEE1394 standard will be explained below using FIG. 3. FIG. 3 is a diagram for explaining the architecture of the IEEE1394 standard of this embodiment.

Building components of the IEEE1394 interface will be explained first. The IEEE1394 interface functionally consists of a plurality of layers. In FIG. 3, the IEEE1394 interface is connected to that of another node via a communication cable 301 complying with the IEEE1394 standard. The IEEE1394 interface has at least one communication port 302, which is connected to a physical layer 303 included in a hardware block.

In FIG. 3, the hardware block comprises the physical layer 303 and link layer 304. The physical layer 303 attains physical/electrical interfaces with another node, detection of a bus reset, a process executed upon detection of the bus reset, encoding/decoding of input/output signals, arbitration of the right to use a bus, and the like. The link layer 304 performs generation and exchange of communication packets, control of a cycle timer, and the like.

In FIG. 3, a firmware block includes a transaction layer 305 and serial bus management 306. The transaction layer 305 manages the asynchronous transfer mode to provide various transactions (read, write, lock). The serial bus management 306 provides a function of performing control of the self node, management of the connection state of the self node, management of ID information of the self node, resource management of the serial bus network, and the like on the basis of a CSR architecture (to be described later).

The aforementioned hardware blocks 303 and 304 and firmware blocks 305 and 306 essentially configure the 1394 interface. Note that this basic configuration is specified by the IEEE1394 standard.

Note that an application layer 307 included in a software block differs depending on the application software used, and controls data communications on the network. For example, in case of moving image data of a digital VTR, the application layer is specified by a communication protocol such as the AV/C protocol or the like.

(2-1) Function of Link Layer 304

Figure 4:
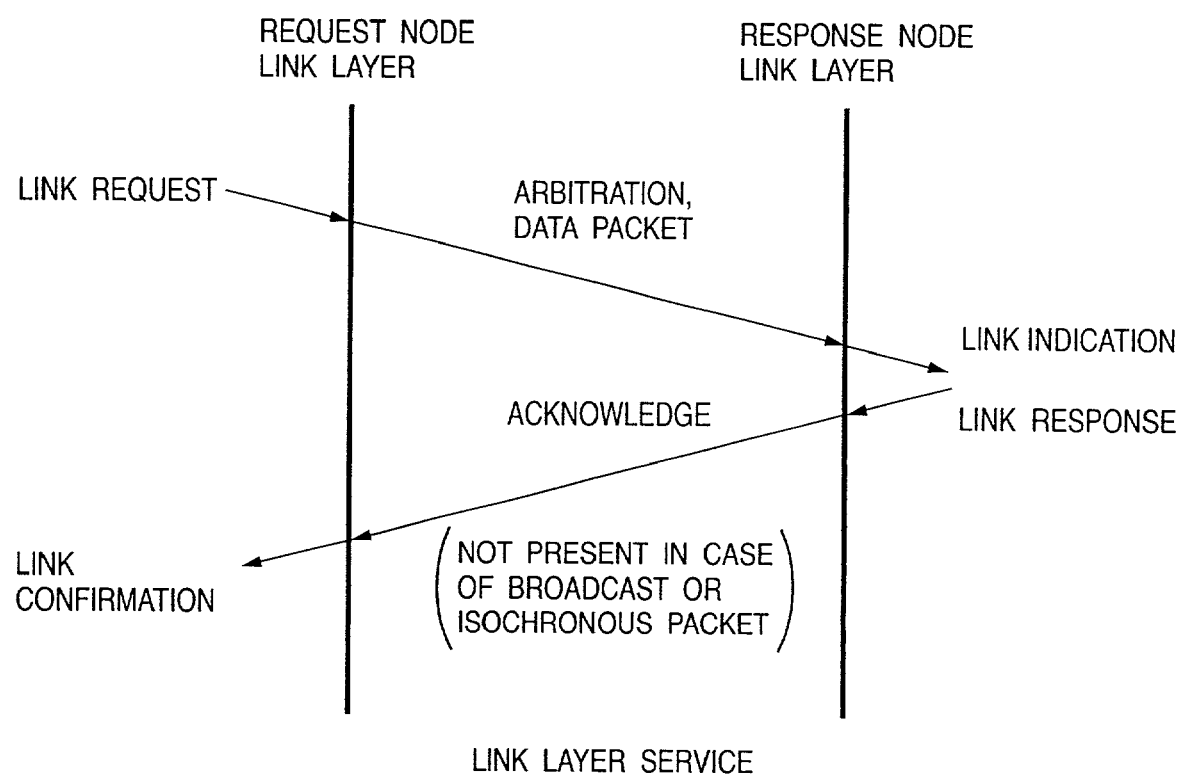
FIG. 4 is a chart showing services that the link layer of this embodiment can provide.

FIG. 4 shows services that the link layer 304 can provide. In FIG. 4, the link layer 304 provides the following four services:

(1) a link request that requests transfer of a predetermined packet of a response node (LK_DATA.request), (2) a link indication that informs a response node of reception of a predetermined packet (LK_DATA.indication), (3) a link response which indicates that an acknowledge from a response node is received (LK_DATA.resonse), and (4) a link confirmation which confirms an acknowledge from a response node (LK_DATA.confirmation). Note that no link response (LK_DATA.response) is present in case of broadcast communications and transfer of isochronous packets.

The link layer 304 implements the aforementioned two different transfer modes, i.e., the asynchronous and isochronous transfer modes on the basis of the aforementioned services.

(2-2) Function of Transaction Layer 305

Figure 5:
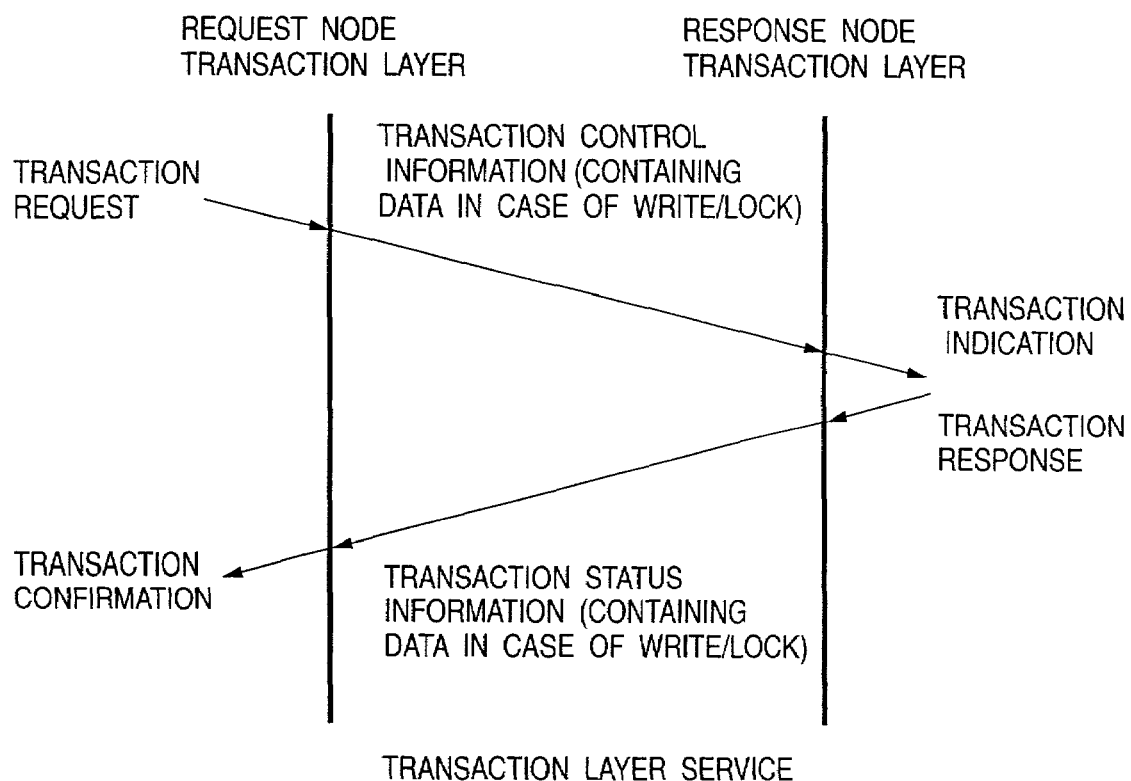
FIG. 5 is a chart showing services that the transaction layer of this embodiment can provide.

FIG. 5 shows services that the transaction layer 305 can provide. In FIG. 5, the transaction layer 305 provides the following four functions:

(1) a transaction request that requests a predetermined transaction of a response node (TR_DATA.request), (2) a transaction indication that informs a response node of reception of a predetermined transaction request (TR_DATA.indication), (3) a transaction response indicating that status information (containing data in case of write/lock) has been received from a response node (TR_DATA.response), and (4) a transaction confirmation that confirms status information from a response node (TR_DATA.confirmation).

The transaction layer 305 manages the asynchronous transfer mode on the basis of the aforementioned services, and implements the following three different transactions:

(1) read transaction, (2) write transaction, and (3) lock transaction.

In read transaction (1), a request node reads information stored at a specific address of a response node.

In write transaction (2), a request node writes predetermined information at a specific address of a response node.

In lock transaction (3), a request node transfers reference data and update data to a response node, compares the reference data with information at a specific address of the response node, and updates the information at the specific address with the update data in accordance with the comparison result.

(2-3) Function of Serial Bus Management 306

The serial bus management 306 can provide the following three functions: (1) node control, (2) an isochronous resource manager (to be abbreviated as IRM hereinafter), and (3) a bus manager.

Node control (1) provides a function of managing the aforementioned layers to manage asynchronous transfer executed with another node.

IRM (2) provides a function of managing isochronous transfer executed with another node. More specifically, the IRM manages information required to assign the transfer band width and channel number, and provides such information to another node.

Only one IRM is present on the local bus, and is dynamically selected from candidates (nodes having the IRM function) every bus reset. The IRM may provide some of functions (management of the connection configuration, power supply management, management of rate information, and the like) that the bus manager (to be described below) can provide.

Bus manager (3) has the IRM function, and provides higher-level bus management functions than the IRM.

More specifically, the bus manager has functions of performing higher-level power supply management (that manages information indicating whether or not electric power can be supplied via a communication cable, whether or not power supply is required, and so forth in units of nodes), higher-level management of rate information (that manages the maximum transfer rate among nodes), higher-level management of the connection configuration (that generates a topology map), optimization of a bus based on such management information, and the like, and providing such information to another node.

Also, the bus manager can provide services for controlling a serial bus network to an application. Note that the services include a serial bus control request (SB_CONTROL.request), serial bus event control confirmation (SB_CONTROL.confirmation), serial bus event indication (SB_CONTROL.indication), and the like.

The serial bus control request (SB_CONTROL.request) is a service that allows an application to request to trigger a bus reset.

The serial bus event control confirmation (SB_CONTROL.confirmation) is a service that confirms the serial bus control request (SB_CONTROL.request) with respect to an application. The serial bus event control indication (SB_CONTROL.indication) is a service that informs an application of an event that occurs asynchronously.

(3) Address Designation

Figure 6:
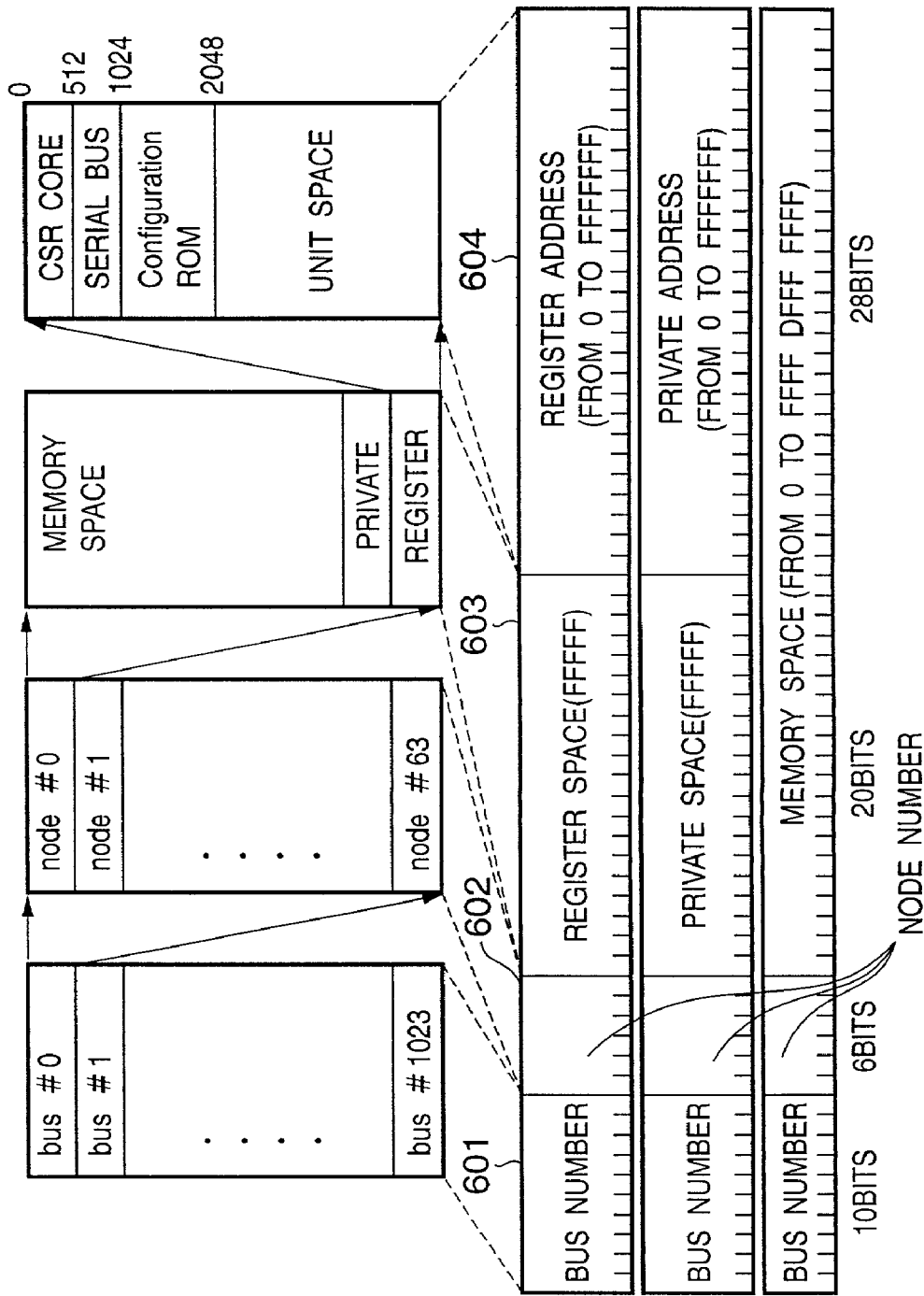
FIG. 6 is a view for explaining the address space of a 1394 serial bus of this embodiment.

FIG. 6 is a view for explaining the address space in the 1394 interface. Note that the 1394 interface specifies a 64-bit wide address space according to the CSR (Command and Status Register) architecture complying with ISO/IEC13213:1994.

In FIG. 6, the first 10-bit field 601 is used to store an ID number for designating a predetermined bus, and the next 6-bit field 602 is used to store an ID number for designating a predetermined device (node). These upper 16 bits are called a "node ID", and each node identifies another node on the basis of this node ID. Each node can make communications while identifying a partner node using this node ID.

A field consisting of the remaining 48 bits designates an address space (256-Mbyte structure) of each node. A 20-bit field 603 of these bits designates a plurality of areas which form the address space.

In the field 603, a space "0 to 0xFFFFD" is called a memory space.

A space "0xFFFFE" is called a private space that each node can freely use. Also, a space "0xFFFFE" is called a register space which stores information common to nodes connected to the bus. Each node can manage inter-node communications using information in the register space.

The last 28-bit field 604 designates an address where information common or unique to each node is stored.

For example, in the register space, the first 512 bytes are used for a core (CSR core) register of the CSR architecture. FIG. 7 shows the addresses and functions of information stored in the CSR core register. Offsets in FIG. 7 indicate relative positions from "0xFFFFF0000000".

The next 512 bytes in FIG. 6 are used for a serial bus register. FIG. 8 shows the addresses and functions of information stored in the serial bus register. Offsets in FIG. 8 indicate relative positions from "0xFFFFF0000200".

Figure 9:
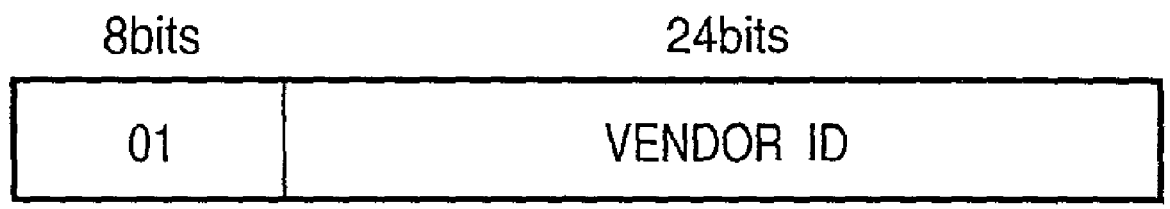
FIG. 9 shows an example of a minimal format of a configuration ROM of this embodiment.

The next 1024 bytes in FIG. 6 are used for a configuration ROM. The configuration ROM has a minimal format or general format, and is allocated from "0xFFFFF0000400". FIG. 9 shows an example of the minimal format of the configuration ROM. In FIG. 9, a vendor ID is a 24-bit numerical value uniquely assigned to each vendor.

Figure 10:
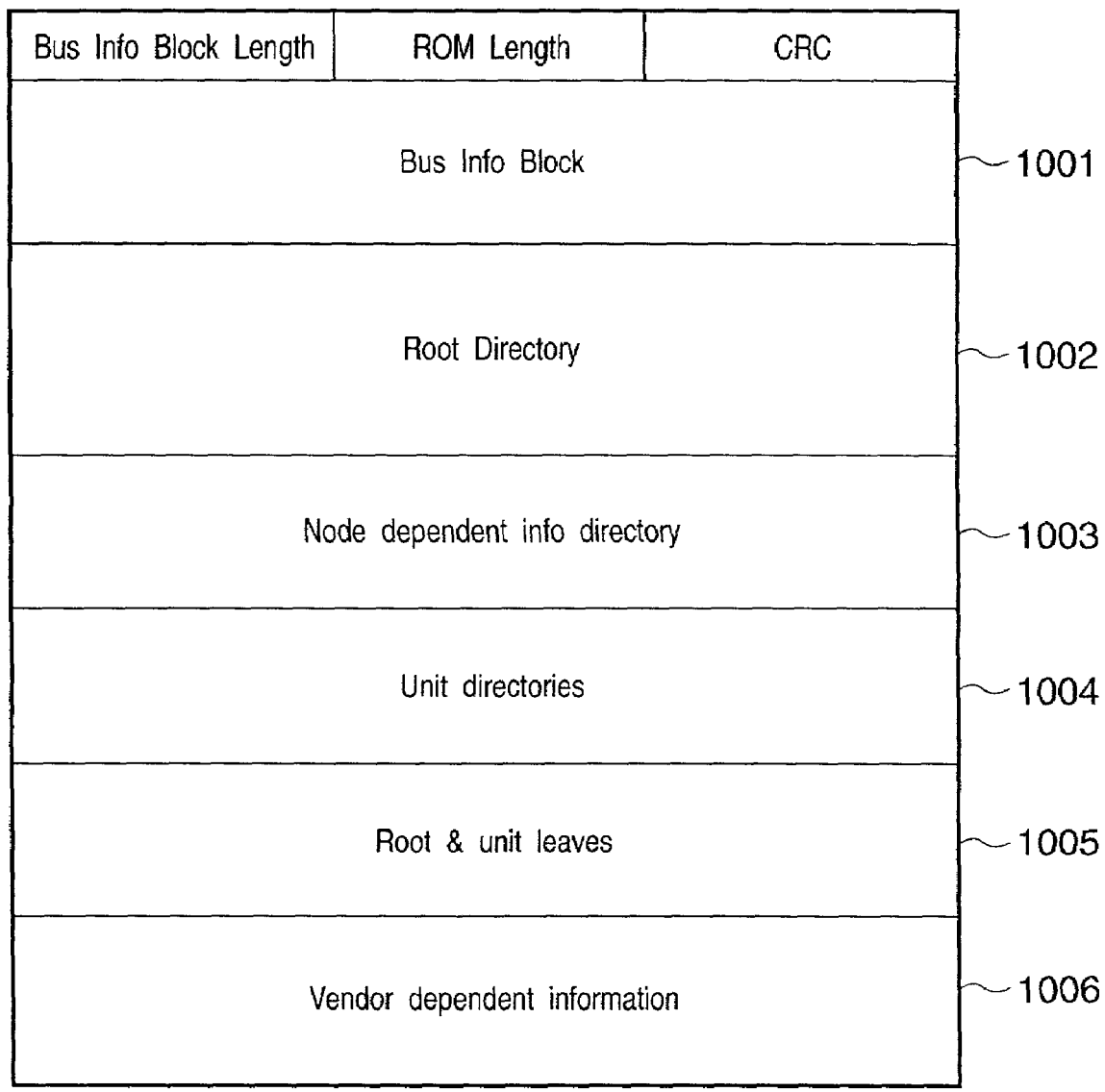
FIG. 10 shows an example of a general format of a configuration ROM of this embodiment.

FIG. 10 shows an example of the general format of the configuration ROM. In FIG. 10, the aforementioned vendor ID is stored in a root directory 1002. A bus info block 1001 and root leaf 1005 can hold a node unique ID as unique ID information that identifies each node.

Note that the node unique ID specifies a unique ID that can specify one node independently of the manufacturers and models. The node unique ID consists of 64 bits, the upper 24 bits of which indicate the aforementioned vendor ID, and the lower 48 bits of which indicate information (e.g., the manufacture number of the node or the like) that the manufacturer of each node can freely set. Note that the node unique ID is used to successively recognize a specific node before and after a bus reset.

In FIG. 10 that shows the configuration ROM of the general format, the root directory 1002 can hold information which pertains to the basic functions of the node. Details of the function information are stored in subdirectories (unit directories 1004) offset from the root directory 1002. The unit directories 1004 store information which pertains to software units that the node supports. More specifically, information that pertains to a data transfer protocol used to make a data communication between nodes, a command set which defines a predetermined communication procedure, and the like is held.

Also, in FIG. 10, a node dependent info directory 1003 can hold information unique to a device. The node dependent info directory 1003 is offset by the root directory 1002.

Furthermore, in FIG. 10, vendor dependent information 1006 can hold information unique to a vendor which manufactured or vended the node.

The remaining area is called a unit space, which designates an address where information unique to each node, for example, identification information (company name, model name, or the like) of each device, a use condition, or the like is stored. FIG. 11 shows the addresses and functions of information stored in a serial bus device register of the unit space. Offsets in FIG. 11 indicate relative positions from "0xFFFFF0000800".

Note that each node should use the first 2048 bytes of the register space to simplify the design of disparate bus systems. That is, the register space is preferably made up of the CSR core register, serial bus register, configuration ROM, and the first 2048 bytes of the unit space, i.e., a total of 4096 bytes.

(4) Structure of Communication Cable

Figure 12:
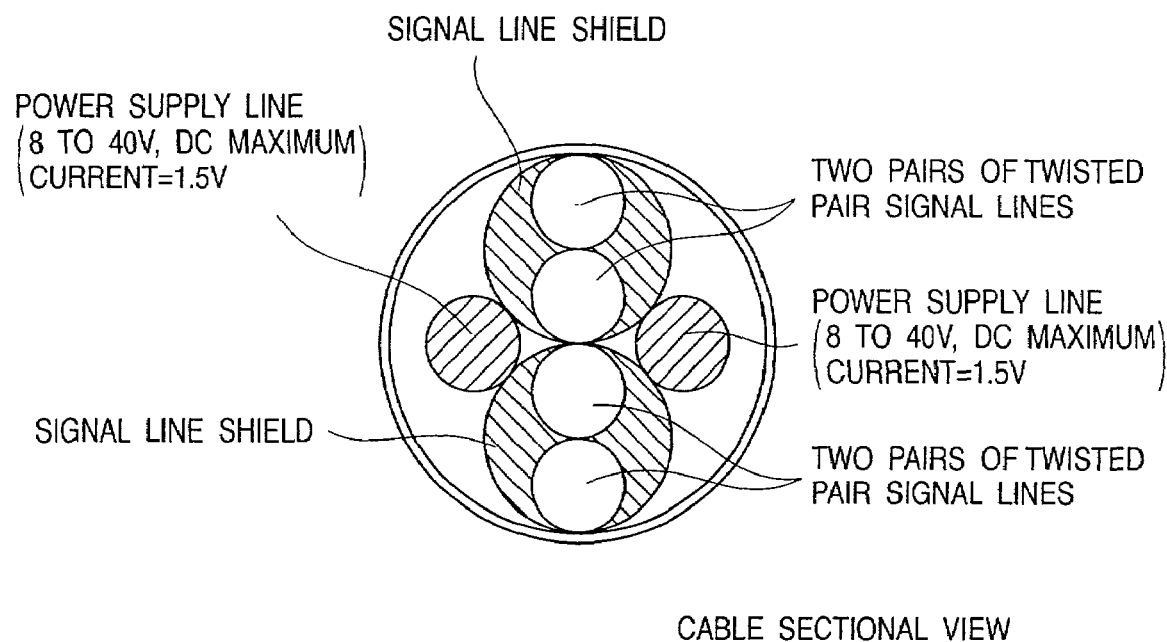
FIG. 12 is a sectional view of a 1394 serial bus cable of this embodiment.

FIG. 12 is a sectional view of a communication cable complying with the IEEE1394 standard.

The communication cable is comprised of two pairs of twisted pair signal lines, and power supply lines. By providing the power supply lines, the 1394 interface can supply electric power even to a device the main power supply of which is OFF, a device whose electric power has dropped due to some failure, and the like. Note that the power supply voltage flowing in the power supply line is specified to fall within the range of 8 to 40 V, and the maximum current is specified to be DC 1.5 A.

Figure 13:
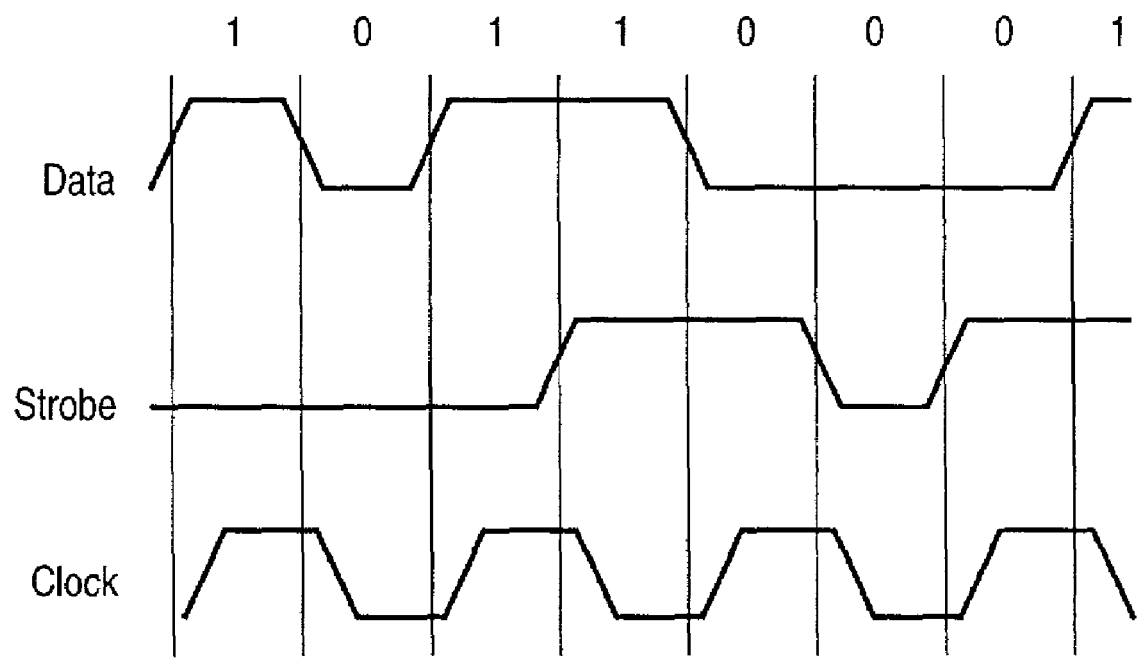
FIG. 13 is a chart showing a DS-Link coding scheme of this embodiment.

The two pairs of twisted pair signal lines transfer information signals encoded by the DS-Link (Data/Strobe Link) encoding scheme. FIG. 13 is a view for explaining the DS-Link encoding scheme in this embodiment.

The DS-Link encoding scheme shown in FIG. 13 is suitable for high-speed serial data communications, and requires two pairs of twisted pair lines. One pair of twisted pair lines send a data signal, and the other pair of twisted pair lines send a strobe signal. The receiving side can reclaim clocks by EX-ORing the data and strobe signals received from the two pairs of signal lines.

Using the DS-Link encoding scheme, the 1394 interface can obtain the following merits: (1) the transfer efficiency is higher than other encoding schemes; (2) the need for a PLL circuit can be obviated to reduce the circuit scale of a controller LSI; and (3) since no information indicating an idle state need be sent, a transceiver circuit can be easily set in a sleep state to reduce consumption power.

(5) Bus Reset Function

The 1394 interface of each node can automatically detect a change in connection configuration of the network. In this case, the 1394 network executes a process called a bus reset in the following procedure. Note that the change in connection configuration can be detected by a change in bias voltage applied to a communication port of each node.

A node that has detected a change in connection configuration of the network (e.g., an increase/decrease in the number of nodes due to insertion/removal of a node, the power ON/OFF of a node, or the like), or a node that must recognize a new connection configuration outputs a bus reset signal onto the bus via the 1394 interface.

The 1394 interface of a node that received the bus reset signal reports generation of a bus reset to its own link layer 304, and transfers that bus reset signal to another node. Upon receiving the bus reset signal, the other node clears the connection configuration of the network recognized so far, and node IDs assigned to the respective devices. After all the nodes detect the bus reset signal, each node automatically executes an initialization process (i.e., recognition of a new connection configuration and assignment of new node IDs) upon bus reset.

Note that the bus reset can be launched when the application layer 307 directly issues a command to the physical layer 303 under the control of the host, in addition to detection of the change in connection configuration.

Upon launching the bus reset, data transfer is temporarily interrupted, and is restarted under a new network after the end of the initialization process upon bus reset.

(6) Sequence After Bus Reset is Launched

After a bus reset is launched, the 1394 interface of each node automatically recognizes a new connection configuration, and assigns new node IDs. The basic sequence from the beginning of the bus reset until assignment of node IDs will be explained below using FIGS. 14 to 16.

Figure 14:
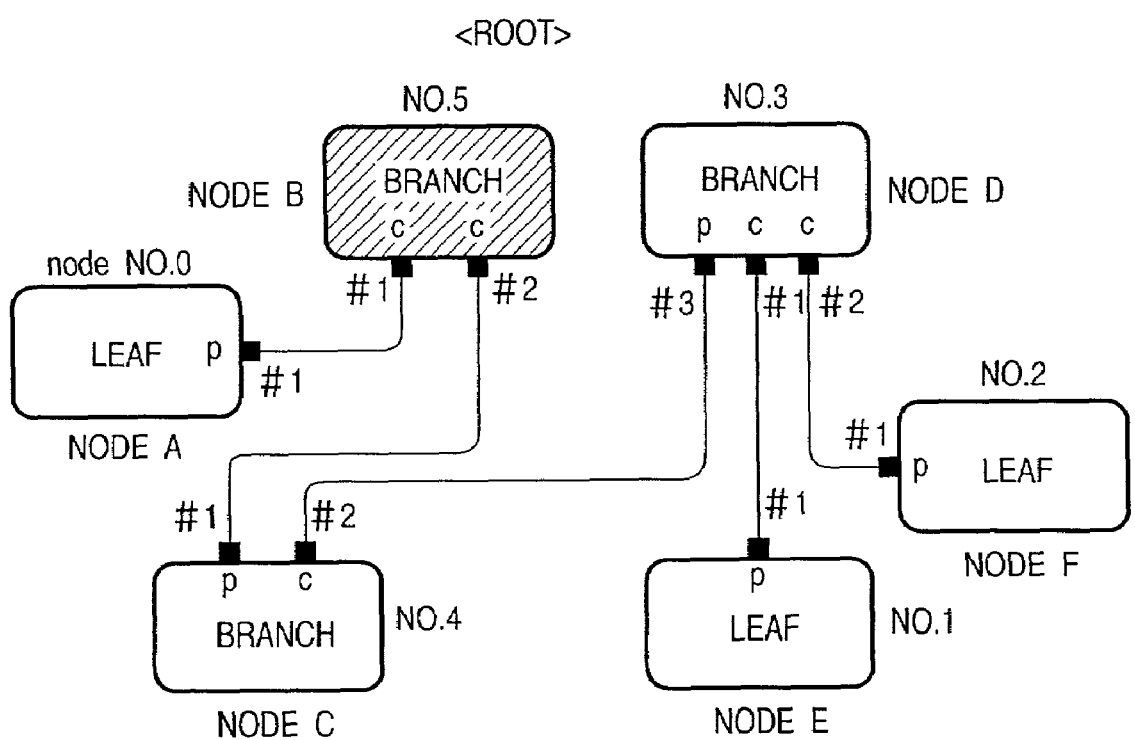
FIG. 14 is a diagram for explaining the state after a bus reset is launched in the 1394 network of this embodiment.

FIG. 14 is a view for explaining the state after the bus reset is launched in the 1394 network shown in FIG. 2.

Referring to FIG. 14, node A comprises one communication port; node B two ports; node C two ports; node D three ports; node E one port; and node F one port. The communication ports of those nodes are assigned port numbers to identify the ports.

Figure 15:
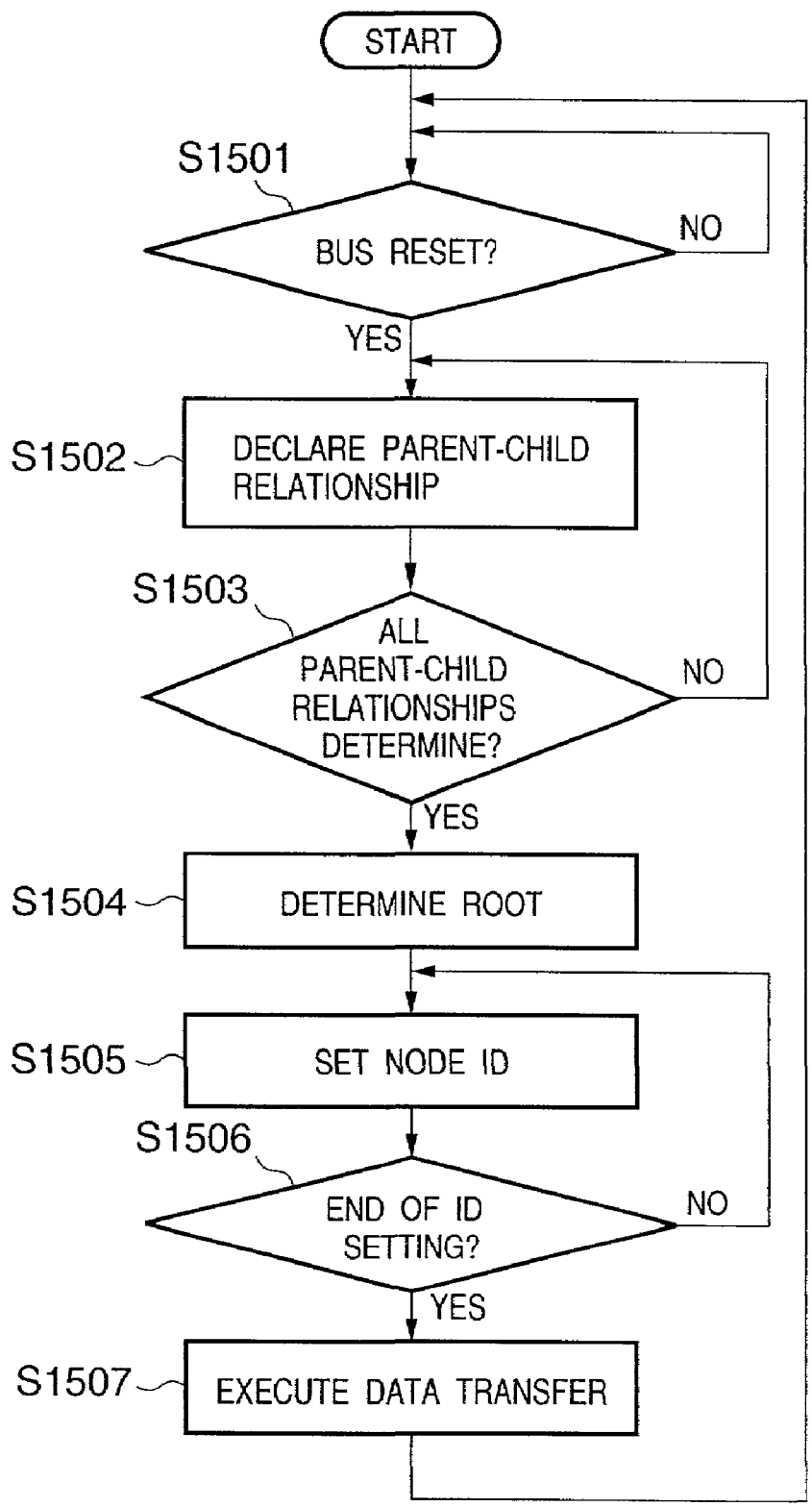
FIG. 15 is a flow chart showing the processes from the beginning of the bus reset to assignment of node IDs in this embodiment.

The sequence from the beginning of the bus reset until assignment of node IDs in FIG. 14 will be described below with reference to the flow chart in FIG. 15. FIG. 15 is a flow chart showing the process from the beginning of the bus reset until assignment of node IDs in this embodiment.

Nodes A to F shown in, e.g., FIG. 14, which form the 1394 network always monitor in step S1501 if a bus reset has occurred. When a node that detected a change in connection configuration outputs a bus reset signal, each node detects a bus reset and executes the processes in step S1502 and subsequent steps.

That is, upon detecting a bus reset, the flow advances from step S1501 to step S1502, and the nodes declare parent-child relationships among their communication ports. It is then checked in step S1503 if parent-child relationships are determined among all the nodes. If parent-child relationships to be determined still remain, the flow returns to step S1502, and the process in step S1502 is repeated until parent-child relationship are determined among all the nodes.

After the parent-child relationships are determined among all the nodes, the flow advances from step S1503 to step S1504. In step S1504, the 1394 network determines a node that arbitrates the network, i.e., a root. After the root is determined, the flow advances to step S1505, and the 1394 interface of each node executes a process for automatically setting the self node ID. It is then checked in step S1506 if node IDs are set for all the nodes, and an ID setting process is complete. If nodes for which node IDs are to be set still remain, the flow returns to step S1505, and each node sets the ID for the next node.

After the node IDs are finally set for all the nodes, the flow advances from step S1506 to step S1507, and each node executes isochronous or asynchronous transfer. Upon completion of data transfer, the 1394 interface of each node returns to step S1501 to monitor a bus reset.

With the aforementioned sequence, the 1394 interface of each node can automatically recognize a new connection configuration and assign new node IDs every time a bus reset is launched.

(7) Determination of Parent-child Relationship

Figure 16:
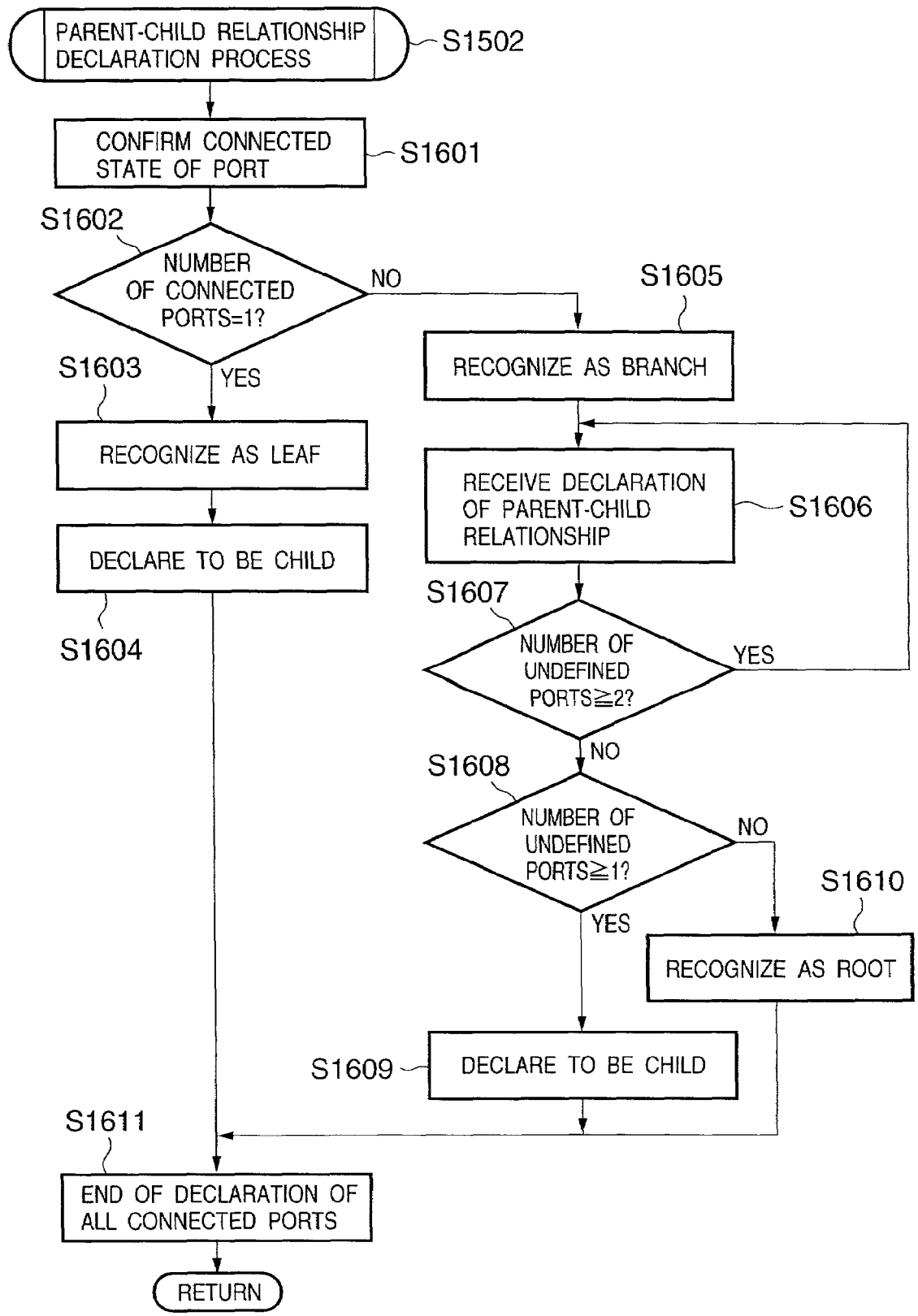
FIG. 16 is a flow chart showing details of a parent-child relationship declaration process in step S1502 shown in FIG. 15.

Details of the parent-child relationship declaration process (i.e., a process for recognizing the parent-child relationships among nodes) in step S1502 in FIG. 15 will be described below using the flow chart in FIG. 16. FIG. 16 is a flow chart showing details of the parent-child relationship declaration process in step S1502 shown in FIG. 15 in this embodiment.

In the parent-child relationship declaration process of this embodiment, nodes A to F on the 1394 network confirm the connection states (connected or non-connected) of their communication ports after the bus reset in step S1601 shown in FIG. 16. After the connection states of the communication ports are confirmed, each node counts the number of communication ports connected to other nodes (to be referred to as connected ports hereinafter) and checks in step S1602 if the number of connected port is one.

If the number of connected ports is one in step S1602, the flow advances to step S1603, and that node recognizes that the self node is a "leaf". Note that the "leaf" is a node which is connected to only one node. In step S1604, the "leaf" node declares itself to be a "child" for a node connected to its connected port. At this time, the leaf recognizes that its connected port is a "parent port (communication port connected to a parent node)". The flow then advances to step S1611.

Note that the parent-child relationship is declared first between the leaf as the end of the network and a branch, and is then declared between branches. The parent-child relationships among nodes are determined in turn from a communication port that can declare earlier. A communication port of a node that has declared itself to be a "child" is recognized as a "parent port", and a communication port that has received that declaration is recognized as a "child port (a communication port connected to a child node)". For example, in FIG. 14, after each of nodes A, E, and F recognizes that the self node is a leaf, they declare a parent-child relationship. In this manner, nodes A and B, nodes E and D, and nodes F and D are respectively determined to be a child and parent.

On the other hand, if it is determined in step S1602 that the number of connected ports is not one but two or more, the flow advances to step S1605, and that node recognizes that the self node is a "branch". Note that the "branch" is a node which is connected to two or more nodes. In step S1606, the "branch" node receives declarations of parent-child relationships from nodes connected to its connected ports. The connected port that received the declaration is recognized as a "child port".

After one connected port is recognized as a "child port", the flow advances to step S1607 to detect if there are two or more connected ports for which a parent-child relationship is not determined yet (i.e., undefined ports). As a result, if there are two or more undefined ports, the flow returns to step S1606 to receive the declaration of a parent-child relationship from a node connected to its connected port.

On the other hand, if it is detected in step S1607 that the number of undefined ports is not 2 or more, the flow advances to step S1608 to check if only one undefined port is present. If only one undefined port is present, the branch recognizes that the undefined port is a "parent port", and declares itself to be a "child" for a node connected to that port in step S1609. The flow then advances to step S1611.

Note that the branch cannot declare itself to be a child for another node until the number of remaining undefined ports becomes 1. For example, in the configuration shown in FIG. 14, each of nodes B, C, and D recognizes that the self node is a branch, and receives declaration from a leaf or another branch. Node D declares a parent-child relationship for node C after parent-child relationships are determined between D and E and between D and F. Node C that received the declaration from node D declares a parent-child relationship for node B.

On the other hand, if no undefined port remains as a result of the process in step S1608 (i.e., if all connected ports of the branch become parent ports), the flow advances to step S1610, and that branch recognizes that the self node is a root. For example, in FIG. 14, node B, all the connected ports of which have become parent ports, is recognized by other nodes to be a root for arbitrating communications on the 1394 network.

In this case, node B is determined as a root. However, when the declaring timing of a parent-child relationship by node B is earlier than that of node C, another node may become a root. That is, every node may become a root depending on the declaring timing. Hence, a given node does not always become a root even in a fixed network configuration.

In this way, after the parent-child relationships are declared among all connected ports, since each node can recognize the connection configuration of the 1394 network as a hierarchical structure (tree structure), completion of declarations of all the connected port is finally determined in step S1611, and the flow returns to the main routine. Note that the aforementioned parent node is a high-level node in the hierarchical structure, and the child node is a low-level node.

(8) Assignment of Node ID

Figure 17:
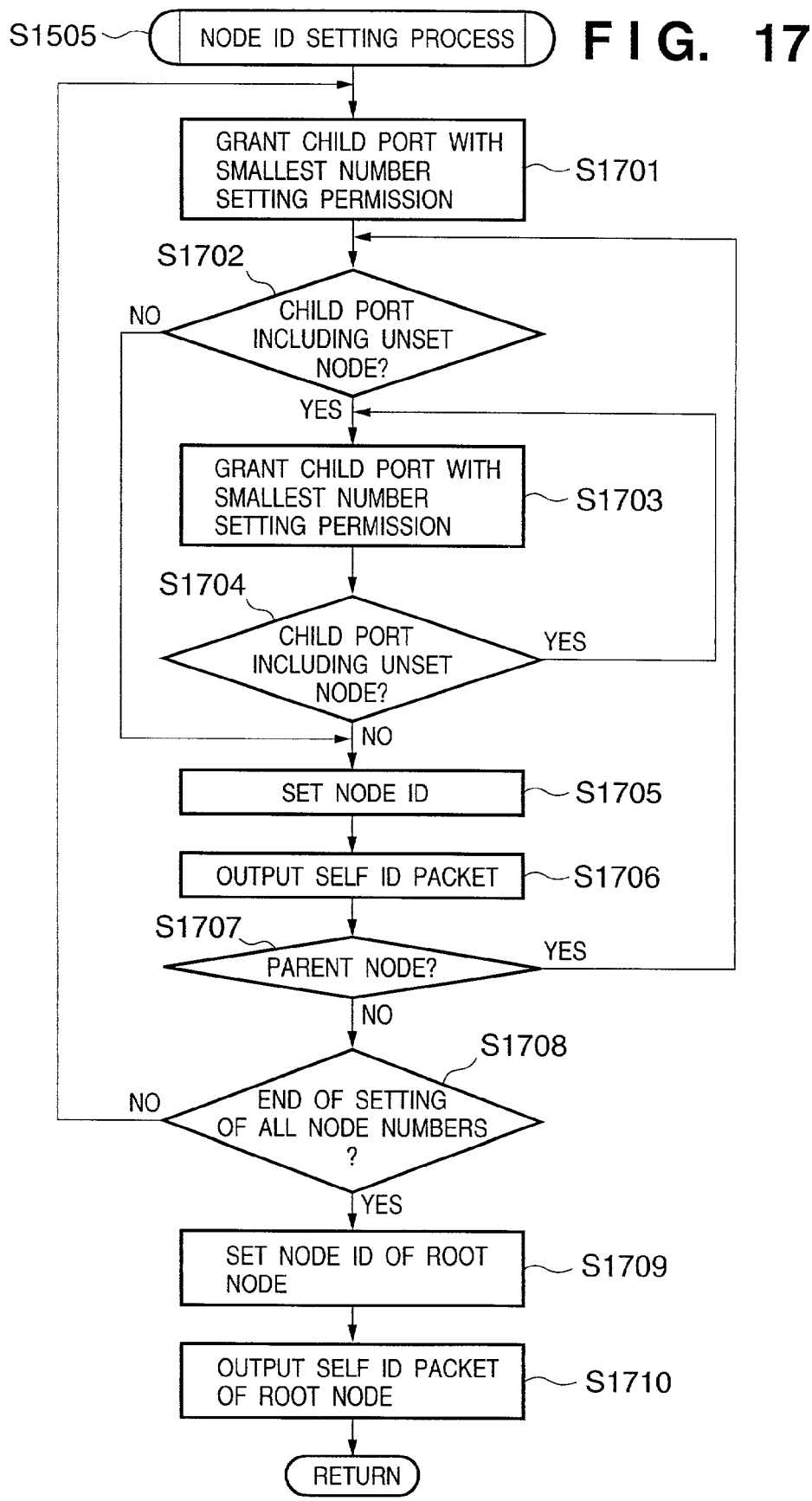
FIG. 17 is a flow chart showing details of a node ID setting process shown in step S1505 in FIG. 15.

The node ID setting process (i.e., a process for automatically assigning node IDs of the respective nodes) in step S1505 shown in FIG. 15 will be described in detail below with reference to FIG. 17. FIG. 17 is a flow chart showing details of the node ID setting process in step S1505 in FIG. 15. Note that the node ID is defined by a bus number and node number. In this embodiment, assume that the respective nodes are connected to a single bus, and an identical bus number is assigned to those nodes.

In the node ID setting process of this embodiment, the root grants a communication port having a smallest number of child ports, to which nodes, the node IDs of which are not set yet, are connected, a node ID setting permission in step S1701. In FIG. 17, the root sets the node IDs of all nodes connected to a child port with the smallest number, then determines that child port to be an already set port, and executes similar control for a child port with the next smallest number. After the node IDs of all the nodes connected to the child ports are set, the root sets the self node ID. The node number contained in the node ID is basically assigned like 0, 1, 2, . . . in the order of leaves and branches. Hence, the root has the largest node number.

The node granted the setting permission in step S1701 checks in step S1702 if its child ports include nodes for which node IDs are not set yet. If no child port including a node for which a node ID is not set yet is detected in step S1702, the flow jumps to step S1705.

If a child port including a node for which a node ID is not set yet is detected in step S1702, the flow advances to step S1703, and the node granted the aforementioned setting permission controls to grant a node directly connected to that child port (a child port with a smallest number) the setting permission. The node granted the setting permission checks in step S1704 if its child ports include nodes for which node IDs are not set yet. If a child port including a node for which a node ID is not set yet is detected, the flow returns to step S1703, and that node grants a child port with the smallest number a setting permission.

On the other hand, if no child port including a node for which a node ID is not set yet is detected in step S1704, the flow advances to step S1705.

If no child port including a node for which a node ID is not set yet is detected in step S1702 or S1704, the flow advances to step S1705, and the node granted the setting permission sets the self node ID. The node that has set the self node ID broadcasts a self ID packet containing information which pertains to the self node number, the connection states of communication ports, and the like in step S1706. Note that broadcasting is to transfer a communication packet of a given node to unspecified many nodes that form the 1394 network.

Upon receiving the self ID packet, each node can recognize the node numbers assigned to the respective nodes, and can detect a node number assigned to itself. For example, in FIG. 14, node B as the root grants node A connected to a communication port with a smallest port number "#1" a node ID setting permission. Node A assigns the self node number "No. 0", and sets a node ID containing the bus number and node number for itself. Also, node A broadcasts a self ID packet containing that node number.

Figure 18:
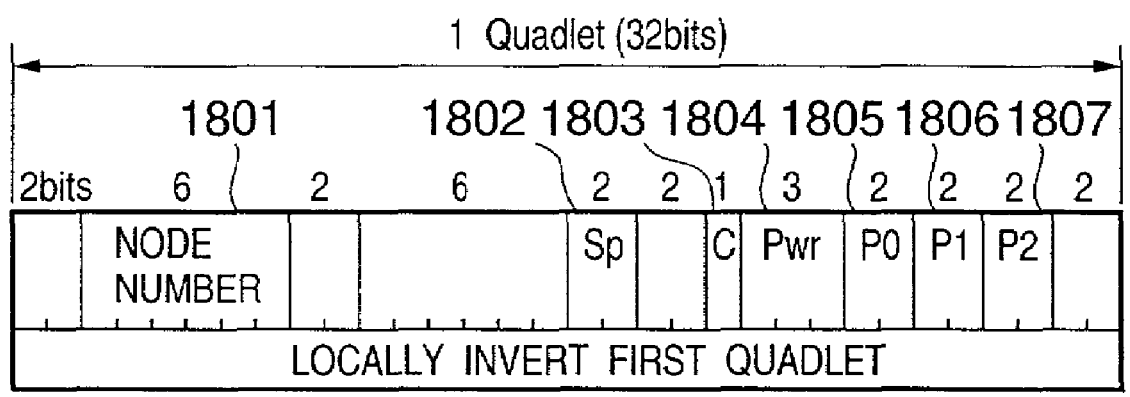
FIG. 18 shows an example of the format of a self ID packet in this embodiment.

FIG. 18 shows an example of the format of the self ID packet output in step S1706. Referring to FIG. 18, reference numeral 1801 denotes a field for storing the node number of a node that output the self ID packet; 1802, a field for storing information which pertains to a compatible transfer rate; 1803, a field indicating the presence/absence of a bus management function (the presence/absence of ability of a bus manager or the like); and 1804, a field for storing information that pertains to characteristics of consumption and supply of electric power.

Also, in FIG. 18, reference numeral 1805 denotes a field for storing information that pertains to the connection state of a communication port with a port number "#0" (connected, non-connected, the parent-child relationship of the communication port, and the like); 1806, a field for storing information that pertains to the connection state of a communication port with a port number "#1" (connected, non-connected, the parent-child relationship of the communication port, and the like); and 1807, a field for storing information that pertains to the connection state of a communication port with a port number "#2" (connected, non-connected, the parent-child relationship of the communication port, and the like).

When a node that outputs the self ID packet has an ability to be a bus manager, a contender bit in the field 1803 is set at "1"; otherwise, the contender bit is set at "0".

Note that the bus manager is a node which has functions of performing power supply management (power supply management of the bus (that manages information indicating whether or not electric power can be supplied via a communication cable, whether or not power supply is required, and so forth in units of nodes), management of rate information (that manages the maximum transfer rate among nodes on the basis of information which pertains to compatible transfer rates of the respective nodes), management of topology map information (that manages the connection configuration of the network on the basis of the parent-child relationship information of communication ports), optimization of the bus based on the topology map information, and the like, and providing such information to another node. With these functions, the node that serves as a bus manager can perform bus management of the overall 1394 network.

In the process shown in FIG. 17, after the process in step S1706, the node that has set the node ID checks in step S1707 if a parent node is present. If a parent node is present, the flow returns to step S1702, and that parent node executes the processes in step S1702 and subsequent steps. Then, that node grants a node for which the node ID is not set yet a permission.

On the other hand, if no parent node is present in step S1707, that node determines that it is the root itself, and the flow advances to step S1708 to check as the root if node IDs have been set for nodes connected to all child ports. If the ID setting process for all the nodes is not complete in step S1708, the flow returns to step S1701, and the root grants one with a smallest number of child ports including that node an ID setting permission. After that, the node executes the processes in step S1702 and subsequent steps.

On the other hand, if the ID setting process for all the nodes is complete in step S1708, the flow advances to step S1709, and the root sets the self node ID. After the node ID is set, the root broadcasts a self ID packet in step S1710. The flow then returns to the main routine.

With the aforementioned process, the 1394 network can automatically assign node IDs to the respective nodes.

After the node ID setting process, if a plurality of nodes have an ability of bus manager, a node with the largest node number becomes a bus manager. That is, if the root having the largest node number in the network has a function of a bus manager, the root becomes a bus manager.

However, if the root does not have such function, a node having the next largest node number to the root becomes a bus manager. A node that becomes a bus manager can be detected by checking the contender bit 1803 in a self ID packet broadcasted by each node.

(9) Arbitration Function

Figure 19A:
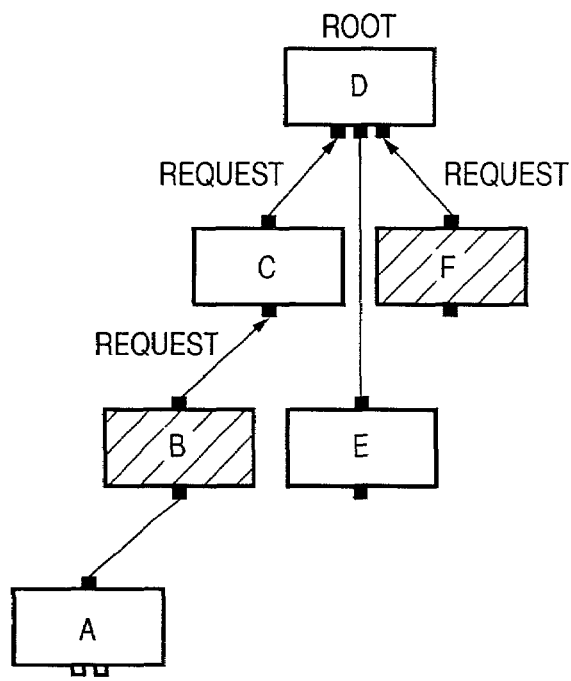
FIGS. 19A and 19B are diagrams for explaining arbitration in the 1394 network of this embodiment.
Figure 19B:
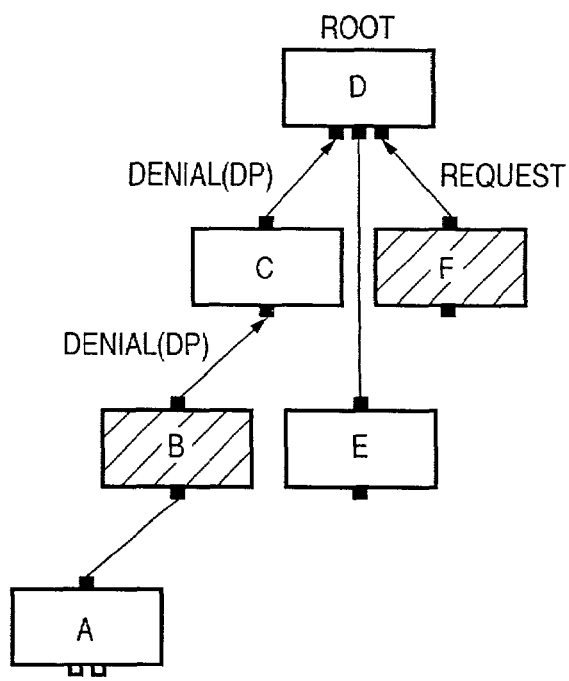

FIGS. 19A and 19B are views for explaining arbitration in the 1394 network of this embodiment shown in FIG. 1.

In the 1394 network, arbitration of the right to use a bus is made prior to data transfer. The 1394 network is a logical bus network, and an identical packet can be transferred to all the nodes in the network by relaying a communication packet transferred from each node to another node. Hence, arbitration is required to prevent communication packets from colliding. As a result, only one node can transfer at a given timing.

FIG. 19A is a view for explaining a case wherein nodes B and F issue requests for the right to use a bus.

After the arbitration begins, nodes B and F issue requests for the right to use a bus to their parent nodes. Upon receiving the request from node B, a parent node (i.e., node C) relays that request for the right to use a bus to its parent node (i.e., node D). This request is finally delivered to the root (node D) that actually arbitrates.

Upon receiving the bus use request, the root determines a node which can use the bus. The arbitration can be done by only the node that serves as a root, and a node that wins arbitration is granted the right to use the bus.

FIG. 19B shows a state wherein the request from node F is granted, and that from node B is denied.

The root sends a DP (Data prefix) packet to the node that loses arbitration, and informs it of denial. The denied node postpones the bus use request until the next arbitration.

By controlling arbitration in this way, the 1394 network can manage the right to use the bus.

(10) Communication Cycle

In this embodiment, the isochronous and asynchronous transfer modes can time-divisionally mix within each communication cycle period. Note that the communication cycle period is normally 125 μs.

Figure 20:
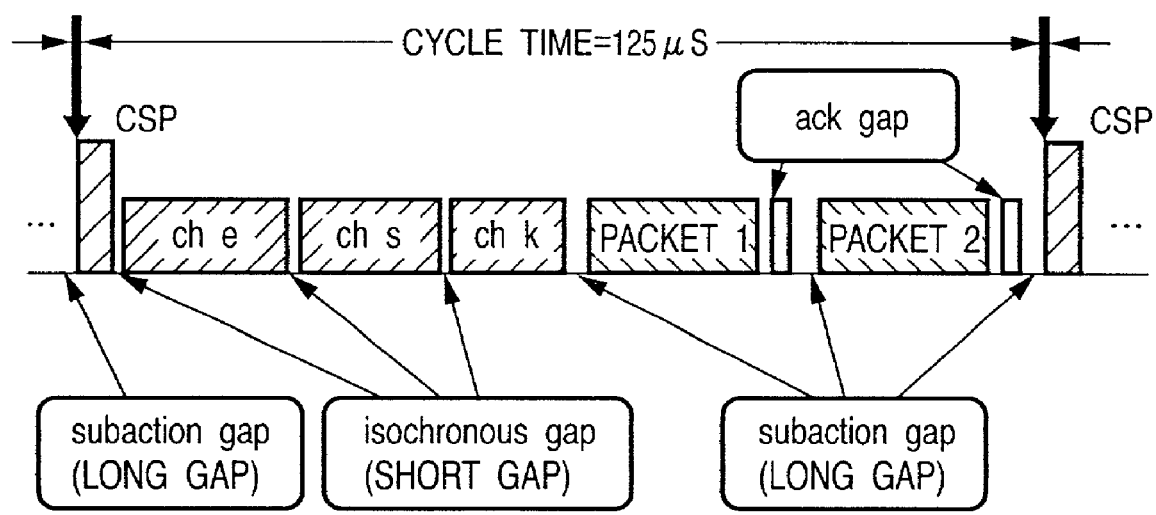
FIG. 20 is a chart for explaining a case wherein isochronous and asynchronous transfer modes mix in one communication cycle of this embodiment.

FIG. 20 is a view for explaining a case wherein the isochronous and asynchronous transfer modes mix within one communication cycle.

In this embodiment, the isochronous transfer mode is executed in preference to the asynchronous transfer mode. This is because an idle period (subaction gap) required to launch asynchronous transfer after a cycle start packet is set to be longer than an idle period (isochronous gap) required to launch isochronous transfer. For this reason, isochronous transfer is executed in preference to asynchronous transfer.

In FIG. 20, upon starting each communication cycle, a cycle start packet (to be abbreviated as "CSP" hereinafter) is transferred from a predetermined node. Each node adjusts time using this CSP to measure time using the same reference as other nodes.

(11) Isochronous Transfer Mode

The isochronous transfer mode is an isochronous transfer scheme. Isochronous mode transfer can be executed during a predetermined period after the communication cycle starts. Also, the isochronous transfer mode is inevitably executed in each cycle to maintain real-time transfer.

The isochronous transfer mode is suitable for transfer of data such as moving image data, audio data, and the like which require real-time transfer. The isochronous transfer mode is not a one-to-one communication unlike the asynchronous transfer mode, but is a broadcast communication. That is, a packet output from a given node is evenly transferred to all nodes on the network. Note that isochronous transfer does not use any ack (reception confirmation reply code).

In FIG. 20, channel e (ch e), channel s (ch s), and channel k (ch k) indicate periods in which respective nodes make isochronous transfer. In the 1394 interface, different channel numbers are given to identify a plurality of different isochronous transfers. In this way, isochronous transfer can be done among a plurality of nodes. Note that the channel number does not specify a destination but merely assigns a logical number to data.

The isochronous gap shown in FIG. 20 indicates an idle state of the bus. After an elapse of a predetermined period of time in this idle state, a node that requires isochronous transfer determines that the bus can be used, and executes arbitration.

Figure 21:
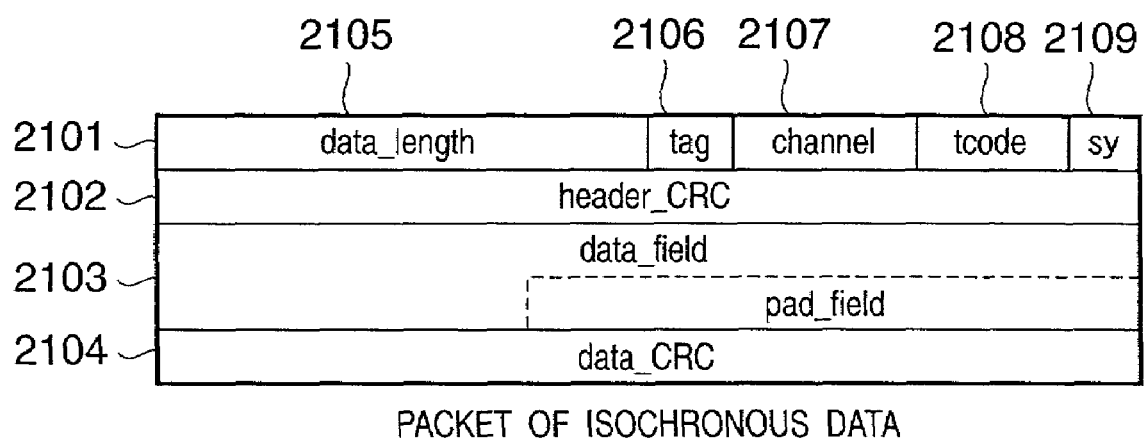
FIG. 21 shows the format of a communication packet transferred based on the isochronous transfer mode of this embodiment.

FIG. 21 shows the format of a communication packet transferred based on the isochronous transfer mode of this embodiment. A communication packet transferred based on the isochronous transfer mode will be referred to as an isochronous packet hereinafter.

In FIG. 21, an isochronous packet is made up of a header area 2101, header CRC 2102, data area 2103, and data CRC 2104.

The header area 2101 includes a field 2105 for storing the data length of the data area 2103, a field 2106 for storing format information of the isochronous packet, a field 2107 for storing the channel number of the isochronous packet, a field 2108 for storing a transaction code (tcode) that identifies the format of the packet and a process to be executed, and a field 2109 for storing a synchronization code.

(12) Asynchronous Transfer Mode

The asynchronous transfer mode of this embodiment is an asynchronous transfer scheme. Asynchronous transfer is a one-to-one communication from the self node to the partner node, and can be executed during a period after the completion of the isochronous transfer period until the next communication cycle starts (i.e., a period until the CSP of the next communication cycle is transferred)

In FIG. 20, the first subaction gap indicates an idle state of the bus. After this idle time has reached a given value, a node that requires asynchronous transfer determines that the bus can be used, and executes arbitration.

Figure 22:
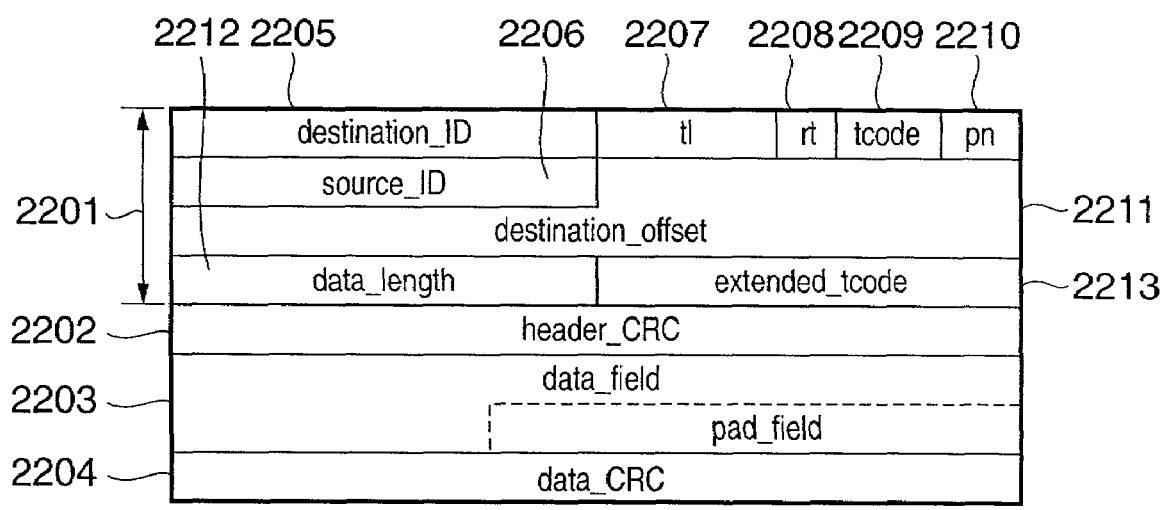
FIG. 22 shows the format of a communication packet transferred based on the asynchronous transfer mode of this embodiment.

A node that acquires the right to use the bus by arbitration transfers a packet shown in FIG. 22 to a predetermined node. Upon receiving this packet, the node sends back ack (reception confirmation reply code) or a response packet after an ack gap.

FIG. 22 shows the format of a communication packet based on the asynchronous transfer mode of this embodiment. A communication packet transferred based on the asynchronous transfer mode will be referred to as an asynchronous packet hereinafter.

Referring to FIG. 22, an asynchronous packet is made up of a header area 2201, header CRC 2202, data area 2203, and data CRC 2204.

In the header area 2201, a field 2205 stores the node ID of a destination node, a field 2206 stores the node ID of the source node, a field 2207 stores a label indicating a series of transactions, a field 2208 stores a code indicating resend status, a field 2209 stores a transaction code (tcode) that identifies the format of the packet and a process to be executed, a field 2210 stores the priority order, a field 2211 stores the memory address of the destination, a field 2212 stores the data length of the data area, and a field 2213 stores an extended transaction code.

A packet transferred from a source node in the asynchronous transfer mode is transferred to all nodes in the network, but is ignored if it is not addressed to the self node. Hence, only the node as the destination can read that packet.

When the transfer timing of the next CSP is reached during asynchronous transfer, the transfer is not forcibly interrupted, and the next CSP is sent after the completion of that transfer. When one communication cycle exceeds 125 µs, the next communication cycle is shortened accordingly. In this manner, the 1394 network can maintain nearly constant communication cycles.

(13) Generate Device Map

As means that allows an application to detect the topology of the 1394 network so as to generate a device map, the following means are available on the IEEE1394 standard.

1) A topology map register of the bus manager is read.
2) Topology is estimated from self ID packets upon bus reset.

However, with these means 1 and 2, topology in the cable connection order based on the parent-child relationships among nodes can be detected, but that of the physical positional relationship cannot be detected (even a port which is not mounted actually may be seen).

Also, means for providing information used to generate a device map as a database in addition to the configuration ROM is available. However, in this case, means for obtaining various kinds of information unwantedly depends on a protocol for database access. Note that a device that observes the IEEE1394 standard inevitably has a configuration ROM itself and a function of reading the configuration ROM.

In this embodiment, information such as the position, function, and the like of a device is stored in the configuration ROM of each node, and a function of reading such information from an application is provided. In this manner, an application of each node can implement a so-called device map display function independently of a specific protocol for database access, data transfer, or the like.

The configuration ROM can store the physical position, function, and the like as information unique to a node, and can be used to implement the device map display function.

In this case, as means that allows an application to detect 1394 network topology based on the physical positional relationship, a method of detecting 1394 network topology by reading the configuration ROM of each node upon bus reset or upon receiving a user's request is available. Furthermore, by describing not only the physical position of the node but also various kinds of node information such as a function and the like in the configuration ROM, function information of each node can be acquired simultaneously with the physical position of that node. When an application acquires configuration ROM information of each node, it uses an API used to acquire arbitrary configuration ROM information of the designated node.

Using such means, an application of each device on the IEEE1394 network can generate various device maps such as a physical topology map, a function map of nodes, and the like in correspondence with various purposes, and such function allows the user to select a device having a function he or she wants.

<Outline of 1394 Bridge>

The arrangement of this embodiment and the connection device will be described.

The technique of an IEEE1394 bridge applied to the digital interface of this embodiment will be briefly explained. Note that the IEEE1394 bridge (to be referred to as "1394 bridge hereinafter) standard is being hatched in the IEEEp1394.1 subcommittee.

In the 1394 standard, a maximum of 63 nodes can be connected to one 1394 bus, and the number of hops is 16. Upon connecting more than 63 1394 nodes to the 1394 network or upon connecting devices which require connections of more than 16 hops since they are at, e.g., remote places, a 1394 bridge is normally used.

Since IEEE1394 uses 64-bit fixed addressing according to the IEEE1212 standards, and specifies 10 bits as a bus ID, a maximum of 1,023 buses except for an ID 1023 for designating a local bus can be connected via 1394 bridges to construct a 1394 network.

The principal function of the 1394 bridge is to control 1394 node transactions between buses via the bridge. In case of a 1394 transaction, a node that issues a transaction, and a destination node are designated using node IDs, as described in <Outline of 1394 Bridge Technique>. The 1394 bridge has as a table topology information, node ID information, and the like of two buses to be connected, and discloses bus/node information to the two buses to be connected, thus allowing transactions between the buses.

In case of a 1394 bus, since a bus reset is generated when the connection pattern changes (e.g., when a device node is additionally connected) or when a given node intentionally issues an instruction, and node IDs are automatically reassigned to have the bus reset as a start point, a bus reset sequence and node ID determination sequence are executed to generate new topology. A detailed description of these sequences will be omitted since they have been explained in the paragraphs of (Bus Reset Sequence) and (Node ID Determination Sequence) of <Outline of 1394 Bridge Technique>.

With such characteristics, since the topology and node ID information of the buses to be connected dynamically change, the bridge also updates that information.

During the 1394 bus reset sequence, data transfer using that bus is interrupted, and a complicated sequence for reassigning node IDs is executed. For this reason, it is very inefficient to transmit a bus reset signal to another bus that does not require any bus reset sequence, and the 1394 bridge inhibits a bus reset signal of one of two connected buses from being transmitted to the other bus.

As other bridge functions, arbitration of 1394 bridges, a packet routing function by information exchange of bridges, and the like are available in a multi-bus network in which a plurality of bus bridges are connected.

The arrangement and functions of a communication system constructed using the 1394 interface have been explained.

[Arrangement of This Embodiment and Connected Device]

Figure 23:
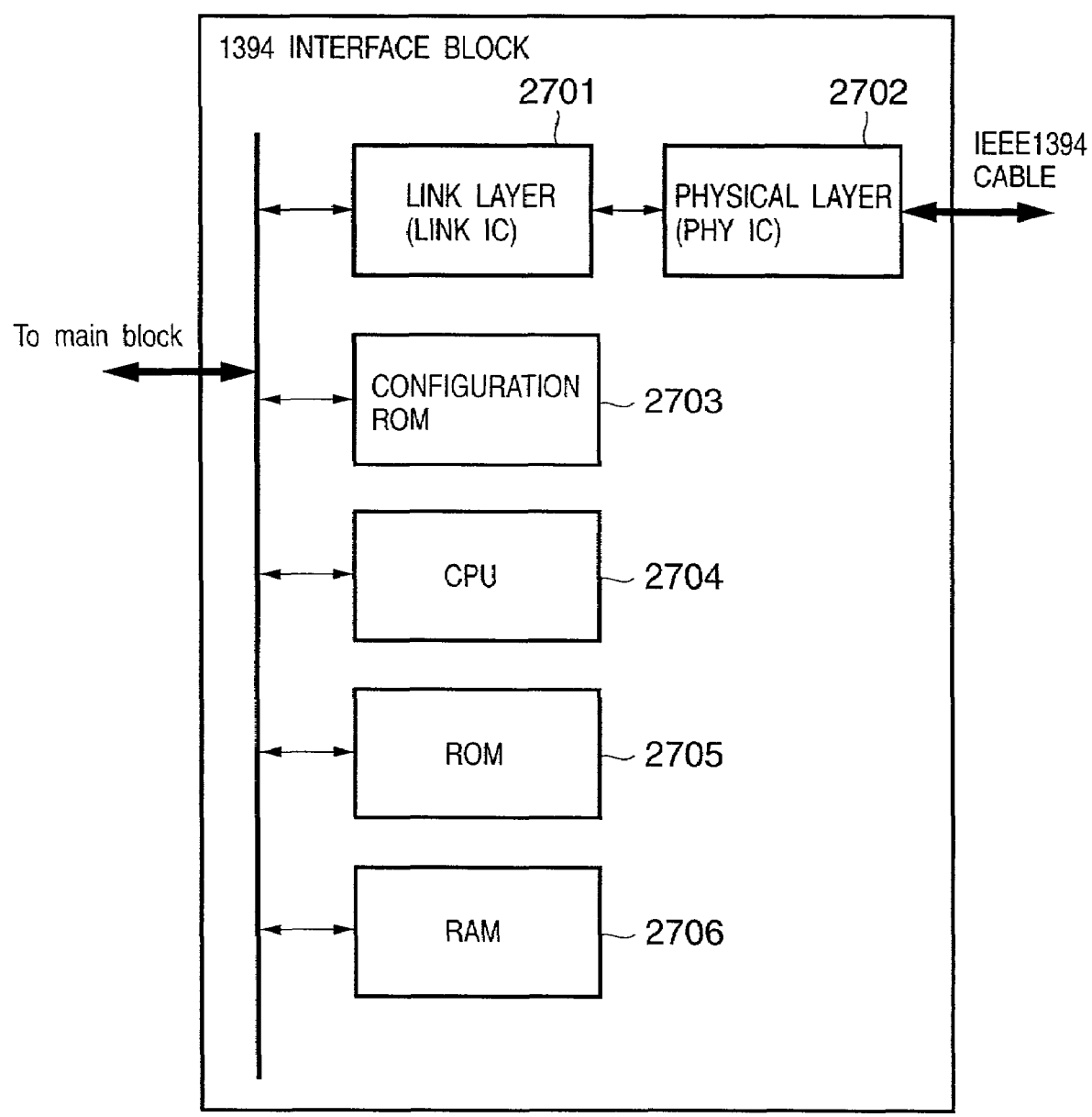
FIG. 23 is a diagram showing the arrangement of a 1394 interface block of a 1394 node of this embodiment.

The arrangement of this embodiment and connected devices will be described. First, the arrangement of the 1394 serial bus interface as common components of nodes connected to each local bus will be described below with reference to FIG. 23. FIG. 23 shows the arrangement of a 1394 interface block of the 1394 node of this embodiment.

Referring to FIG. 23, reference numeral 2701 denotes a link layer control IC (LINK IC) for controlling data transfer of a PHY IC. The LINK IC implements the function of the link layer in (Outline of IEEE1394 Technique) mentioned previously. Principal functions of this IC include a transmission/reception FIFO for temporarily storing transmission/reception data via the PHY IC, a packetization function of transmission data, a discrimination function of checking if data received by the PHY IC is addressed to this node address or assigned channel in case of isochronous transfer data, a receiver function of checking errors of that data, and a function of interfacing with a device main body.

Reference numeral 2702 denotes a physical layer control IC (PHY IC) for directly driving the 1394 serial bus. The PHY IC 2702 implements the function of the physical layer in (Outline of IEEE1394 Technique) mentioned previously. Principal functions of this IC include bus initialization and arbitration, encoding/decoding of transmission data codes, monitoring of a cable energization state and supply of a load termination power supply (to confirm active connection), and interfacing with the link layer IC.

Reference numeral 2703 denotes a configuration ROM which stores identification information unique to each device, communication conditions, and the like. The data format of this ROM complies with that specified by the IEEE1212 and IEEE1394 standards, as has been explained in <Outline of IEEE1394 Technique>.

Reference numeral 2704 denotes a CPU for controlling the 1394 interface block including the link layer IC, PHY IC, and the like; and 2705, a ROM that stores a control program for the interface block. Reference numeral 2706 denotes a RAM which is used as a data buffer for storing transmission/reception data, a control work area, and data areas for various registers mapped at the 1394 address.

Figure 24:
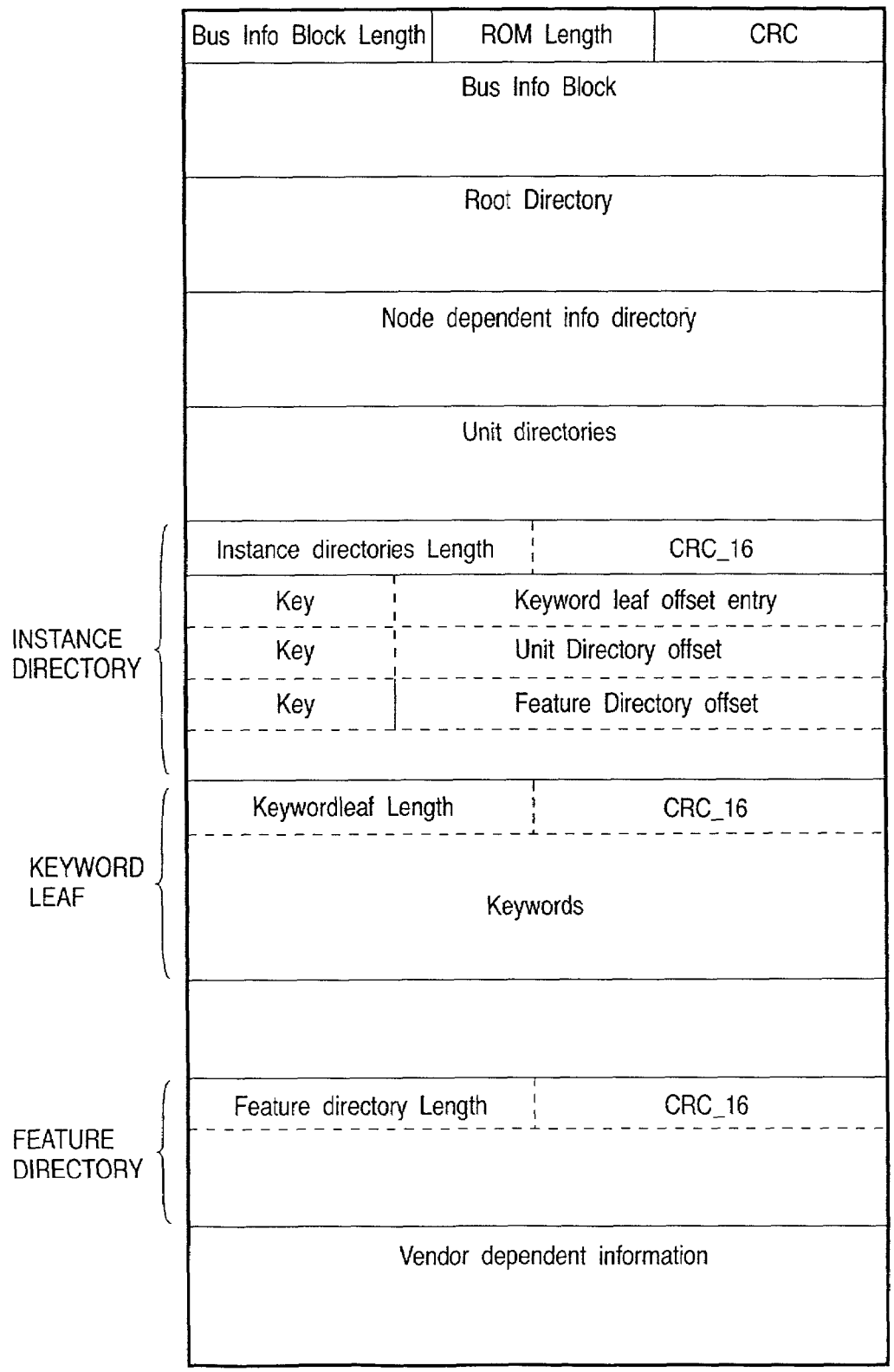
FIG. 24 shows the format of data stored in the configuration ROM of this embodiment.

Each node comprises the configuration ROM of the general format shown in FIG. 24, in which software unit information of each device is saved in a unit directory, and information unique to the node is saved in a node dependent info directory.

A basic function instance of each device such as a printer function, scanner function, or the like, and detailed information attached to that basic function can be saved in an instance directory offset from the root directory.

The configuration of the instance directory will be explained. The instance directory stores information of a device such as a printer, scanner, or the like independent from protocols. In case of a single-function device, one basic function information is stored, and when a device supports a plurality of functions, a plurality of functions are listed. The instance directory saves pointer information to a unit directory that saves protocol software information corresponding to each of listed functions, and a pointer to a feature directory to save unique detailed information that pertains to each function.

Figure 25:
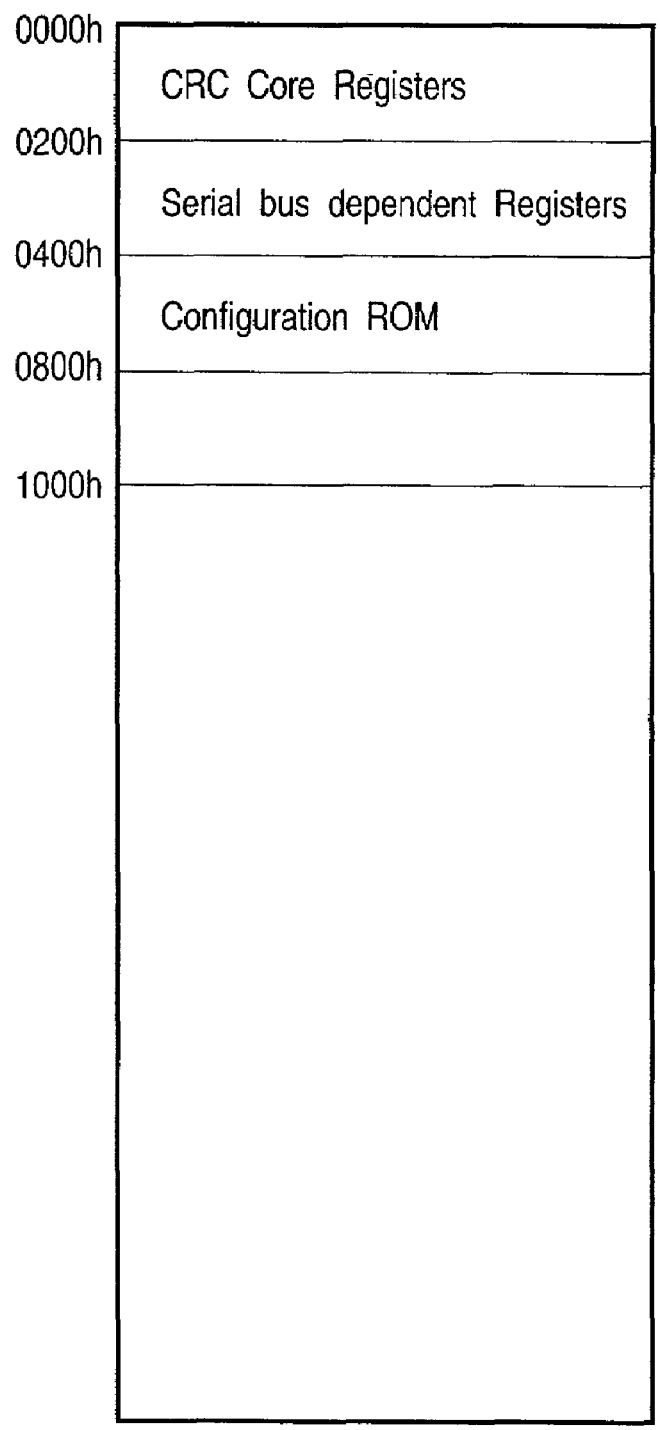
FIG. 25 shows an address space of the 1394 node of this embodiment.

As has been explained in <Outline of IEEE1394 Technique>, the last 28 bits of address setups of the 1394 serial bus are assured as an area of data unique to each device, which can be accessed by another device connected to the serial bus. FIG. 25 shows the address space of the 28-bit area as the area of data unique to each device.

The CSR core registers shown in FIG. 11 are allocated in an area from addresses 0000 to 0200 in FIG. 25. These registers are present as a basic function for node management specified in the CSR architecture.

An area from addresses 0200 to 0400 is defined as an area for storing registers associated with the serial bus. FIG. 26 shows an example of the area for storing registers associated with the serial bus of this embodiment. As has been explained in <Outline of IEEE1394 Technique>, registers of addresses 0200 to 0230 are defined, and those used in power supply bus resource management, and the like are allocated. This is the same as the configuration shown in FIG. 12.

Figure 27:
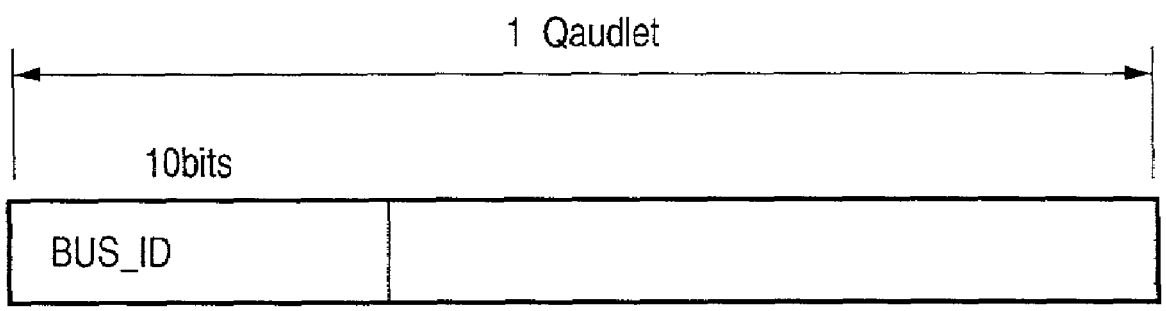
FIG. 27 shows a REMOTE_BUS_RESET register of the 1394 node of this embodiment.

A register, REMOTE_BUS_RESET allocated at address 0240 is a characteristic feature of this embodiment, and FIG. 27 shows the format of this register.

A node in which data that has an effective bus ID substituted in a BUS_ID field according to the format in FIG. 27 is written in that register by 1394 write transaction can detect a bus reset generated on a remote bus expressed by the BUS_ID field other than the local bus to which the self node is connected.

Figure 30:
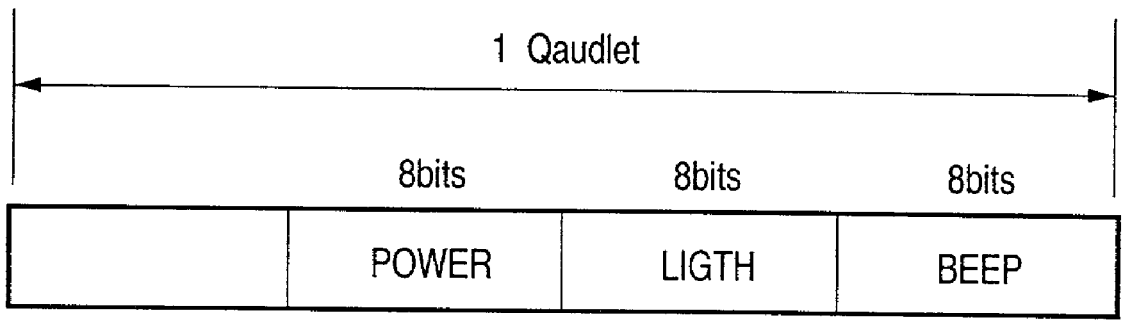
FIG. 30 shows an EVENT_CONTROL register of the 1394 node of this embodiment.

A register, EVENT_CONTROL allocated at address 0244 in FIG. 26 is a characteristic feature of this embodiment, and FIG. 30 shows the format of this EVENT_CONTROL register. FIG. 30 shows the EVENT_CONTROL register of the 1394 node of this embodiment.

Designations of BEEP, LIGHT, and POWER are written in this EVENT_CONTROL register by 1394 write transaction in accordance with the format shown in FIG. 30. With this write, an event corresponding to each written value is controlled to take place in the designated device.

More specifically, "BEEP" designated by 8 bits instructs the designated device to beep, and the designated device beeps in accordance with values shown in FIG. 30. The type of sound can be simultaneously designated, thus distinguishing the contents the user is informed.

"LIGHT" instructs the designated device to emit light (to turn on an LED or the like), and the designated device emits light in accordance with values shown in FIG. 30. The type of light can be simultaneously designated, thus distinguishing the contents the user is informed.

"POWER" instructs the designated device to turn on/off a power supply, and ON/OFF of the designated device can be controlled in accordance with values shown in FIG. 30. That is, the user can turn on/off the power supply of a specific device at a remote place.

The aforementioned configuration ROM is allocated from addresses 0400 to 0800.

An area from addresses 0800 to 1000 shown in FIG. 25 stores the current topology information of the 1394 bus, and information that pertains to the transfer rate between nodes. An area after address 1000 is called a unit space, in which registers associated with operations unique to each device are allocated. In this area, registers and a data transfer mapped buffer area specified by a high level protocol that each device supports, and registers unique to each device are allocated.

Figure 28:
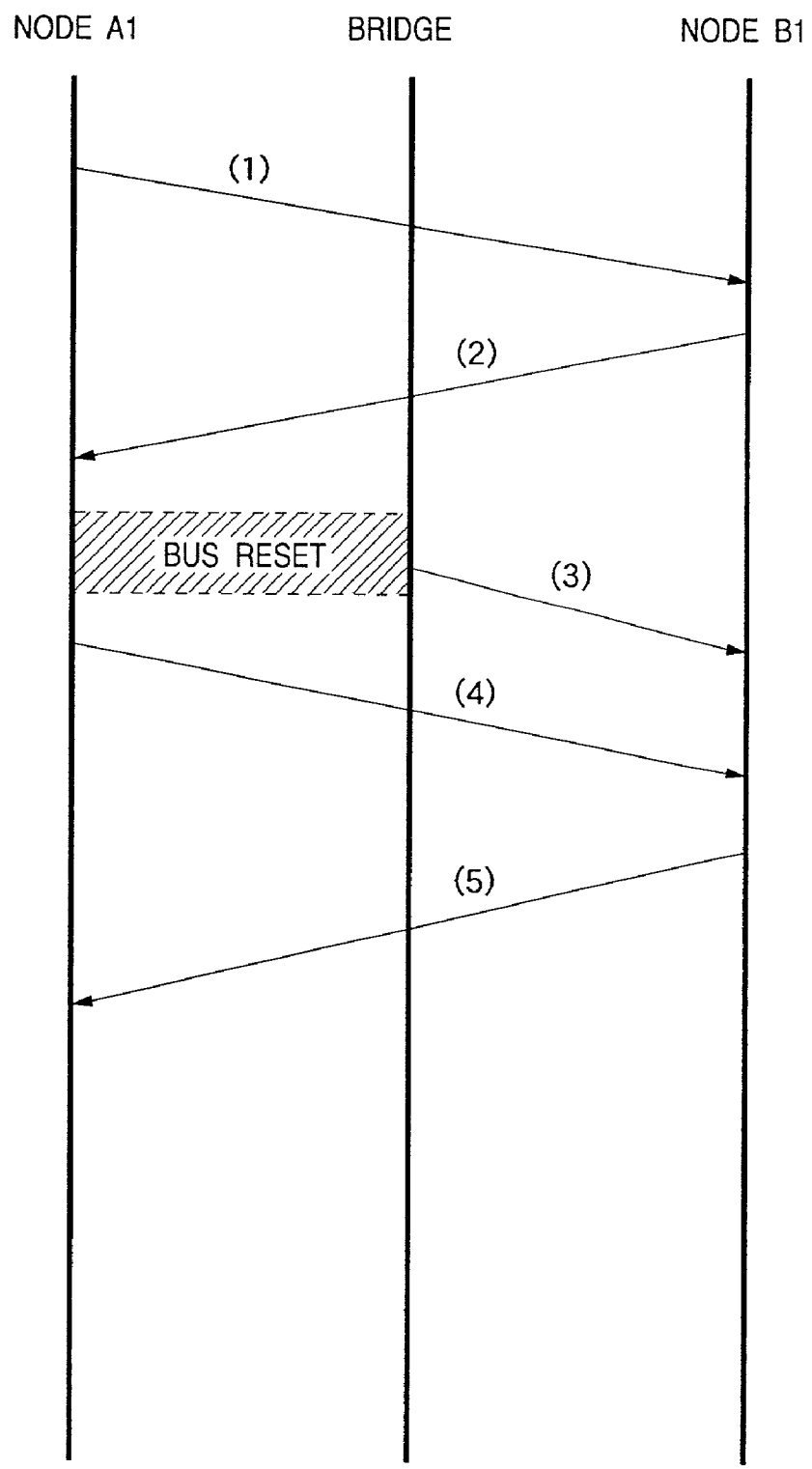
FIG. 28 is a chart showing the communication control procedure complying with the DPP protocol of this embodiment.
Figure 29:
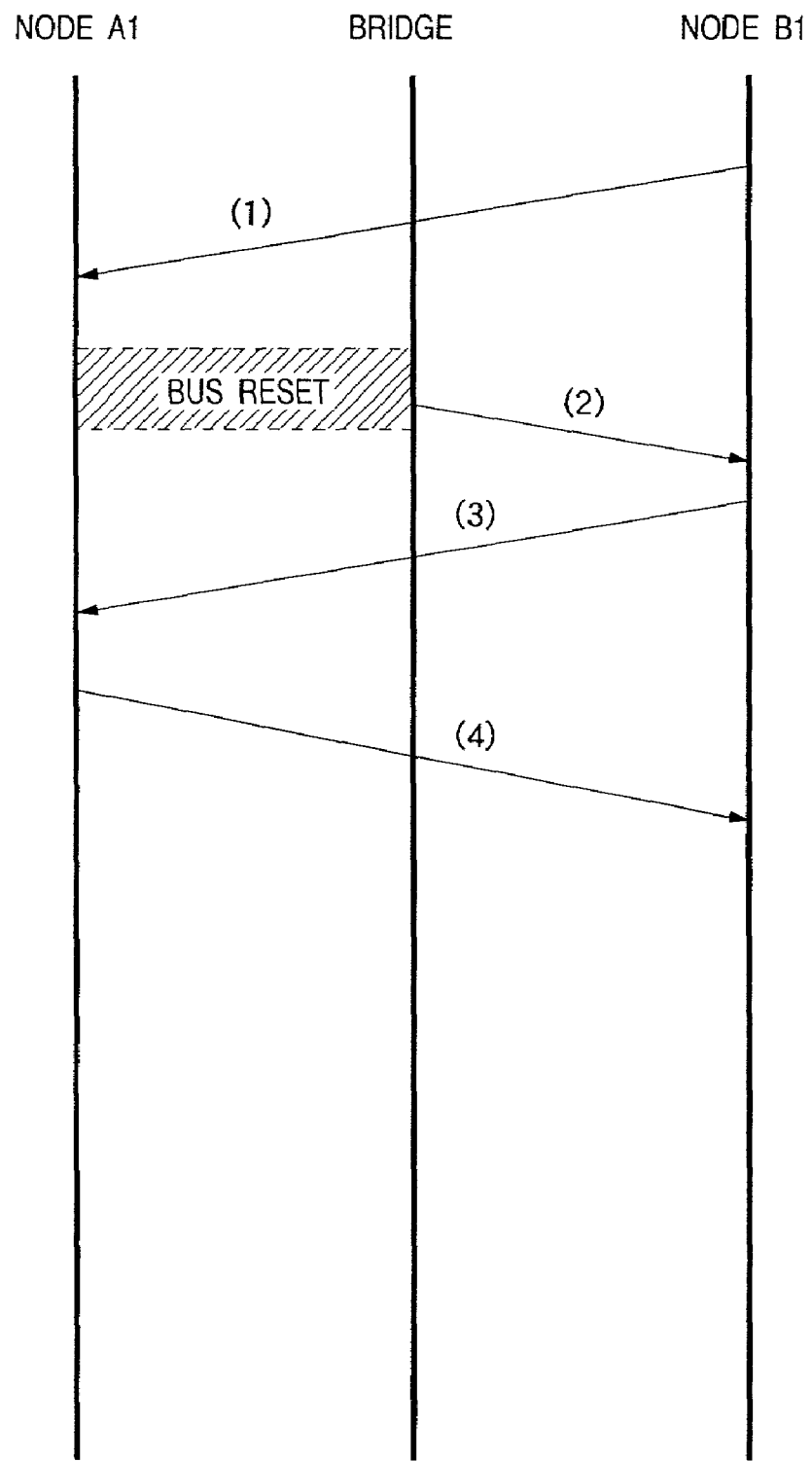
FIG. 29 is a chart showing the communication control procedure complying with the AV/C protocol of this embodiment.

The operation of this embodiment in the 1394 network in which devices A1 and A2 comprising the 1394 interface blocks with the above arrangement are connected to bus A, devices B1 and B2 are connected to bus B, and buses A and B are connected via the 1394 bridge device, as described above, will be described below with reference to FIGS. 28 and 29. FIG. 28 is a chart showing the communication control procedure complying with the DPP protocol of this embodiment, and FIG. 29 is a chart showing the communication control procedure complying with the AV/C protocol of this embodiment.

Before the current connection configurations of buses A and B are obtained, since a bus reset is independently generated for each bus every time a device node is additionally connected, a bus reset sequence and node ID determination sequence are executed to automatically assign node IDs to have the bus reset as a start point, thus generating new topology.

After that, 1394 data transfer starts in each bus. A detailed description of this sequence will be omitted since it has been explained in the paragraphs of (Bus Reset Sequence) and (Node ID Determination Sequence) of <Outline of 1394 Bridge Technique>. Although the operation varies depending on the order the nodes are connected and the order the buses are connected to the 1394 bridge, assume that the current topology in which devices A1 and A2 are connected to bus A, devices B1 and B2 are connected to bus B, and buses A and B are connected via the 1394 bridge is finally formed by repeating the bus reset—1394 initialization sequence every time a node is connected.

In the state wherein the aforementioned topology of the 1394 network is determined, and 1394 data transfer is normally made, node A1, a digital still camera which comprises a Direct Print Protocol (to be abbreviated as "DPP" hereinafter) as a high level protocol searches for a printer device that supports DPP as in the self node on the 1394 network in response to user's operation or application's trigger, so as to transfer and print image data using a printer connected to the 1394 network.

This process is implemented by reading out the configuration ROMs of partner nodes connected to the network. More specifically, using read transaction of IEEE1394 for partner nodes, the contents of the ROM of the partner nodes are sent back as read responses.

As described above, the configuration ROM of each node describes the basic function of each node such as a printer, camera, or the like in the instance directory, and information that pertains to a high level protocol and software such as the AV/C protocol, DPP, or the like in the unit directory in addition to 1394-related information.

Node A1 reads out the ROMs of the nodes connected to local bus A, and then reads out ROMs of the nodes connected to bus B via the 1394 bridge. During this process, node A1 detects that node B1 is a printer and DDP device.

Note that a detailed description of 1394 transactions via the 1394 bridge will be omitted, and their standards are being hatched in IEEEp1394.1.

After the camera as node A1 finds node B1 which is a printer and comprises the same protocol as the DPP protocol that the self node supports, it establishes a connection with node B1 in accordance with the sequence and format defined by the DPP protocol shown in FIG. 28.

That is, node A1 sends a connection request command to node B1 using a write transaction, as indicated by (1) in FIG. 28, and node B1 sends a connection request response using a write transaction, as indicated by (2) in FIG. 28, in response to that command, thus starting transfer of application data.

Likewise, assume that node B2, a digital camcorder which comprises the AV/C protocol as a high level protocol begins to exchange AV/C commands with node A2 using the AV/C protocol via the 1394 bridge, and node B2 issues an AV/C command, as indicated by (1) in FIG. 29, and is waiting for a response.

In the aforementioned network state, new device node A3 (FIG. 1, 108) is connected to bus A by user's operation. Since the new node is additionally connected, a bus reset is generated according to the characteristics of IEEE1394. The 1394 interface layer of each node connected to bus A, which received a bus reset signal, informs a high level protocol layer of that information, and starts a series of bus reset recovery processes such as a bus reset sequence and node ID determination sequence to automatically assign node IDs to have the bus reset as a start point.

In node A1 which have been making data transfer by establishing a connection with node B1 of bus B in accordance with the DPP standard in bus A, when the DPP layer is informed of the bus reset of bus A, the bus reset recovery processes according to the DPP standard start.

The bus reset recovery processes in DPP is specified as follows. That is, when data transfer recovers normally after the bus reset recovery process is completed in the 1394 layer and new node IDs and topology are determined, a node that output a connection request first outputs a reconnect request command, i.e., reconnection request to the partner node within a prescribed period of time, before data transmission restarts.

Also, in this specification, the node that received a request upon establishing a connection waits for a reconnect request command from the node with which the connection has been established, after bus reset recovery is completed in the 1394 layer, and aborts that connection if it does not receive the command within a prescribed period of time.

In node B1 which have been making data transfer with node B2 of bus B in accordance with the AV/C standard in bus A, when the AV/C layer is informed of a bus reset of bus A, a bus reset correspondence process according to the AV/C standard starts.

According to the AV/C protocol, in response to an AV/C command sent from one node, a node that received the command outputs a response which is paired with that command and contains information such as a command execution result to the command source node. Also, in this specification, upon generation of a bus reset, since an AV/C command, which was output before the reset and a response to which is not received, is considered to have been aborted before execution, the command must be resent after the bus reset process recovers and data transfer recovers normally.

On the other hand, no bus reset is generated in bus B, the connection configuration of which remains unchanged, and even when a bus reset is generated in bus A which is connected to bus B via the 1394 bridge node 101, that bus reset signal is detected but is not transmitted to another bus (in this case, bus B) owing to the characteristics of the 1394 bridge. Therefore, the bus reset recovery process starts in only nodes A1, A2, and A3 connected to bus A, but does not start in node B1 as a data destination of node A1 and node B2 as a data destination of node A2.

However, the 1394 network system of this embodiment is characterized in that the 1394 bridge comprises means for informing nodes connected to one bus of bus reset generation information in another bus, and each node comprises means for receiving the bus reset generation indication in the remote bus.

More specifically, the 1394 bridge 101 that received a bus reset signal upon generation of a bus reset in bus A executes a bus reset process on the node controller side connected to bus A, and informs the bus B node controller side of generation of a bus reset together with bus ID information of bus A, i.e., a value 3FDh.

Upon receiving this information, the bus B node controller writes a packet, which contains as data the bus ID: 3FDh of the remote bus in which the bus reset has occurred, in a register "REMOTE_BUS_RESET" allocated at address 0240 of each node connected to bus B in the register format using 1394 write transaction.

Although no bus reset is generated in bus B, the 1394 bridge node 101 writes the ID of bus A in the REMOTE_BUS_RESET register of each node, as shown in (3) in FIG. 28 or (2) in FIG. 29, thus indicating generation of a bus reset in remote bus A.

The 1394 interface layer of each node of bus B, which has detected write in the REMOTE_BUS_RESET register informs the high level protocol layer of generation of a bus reset in the remote bus and the bus ID information of that remote bus.

Node B1 that has been making data transfer by establishing a connection with node A1 of bus A in accordance with the DPP standard in bus B checks the ID of the remote bus in which the bus reset has occurred, and confirms that the remote bus is bus A to which the node as the connection destination is connected. Then, node B1 recognizes that the connection destination node, i.e., node A1 has started a bus reset recovery process according to the DPP standard.

Node B1 also starts a process corresponding to the DPP bus reset process, and waits for a reconnect request command from the node to which the connection has been established. In this manner, consistency of the DPP protocol process can be assured between node A1 that has started the bus reset process upon generation of a bus reset in practice, and node B1 which is connected to bus B where no bus reset occurs.

After that, node A1 sends a reconnect request command shown in (4) in FIG. 28 to node B1, and node B1 sends a reconnect request response shown in (5) in FIG. 28 to node A1, thus restarting a data communication.

Likewise, node B2 that has exchanged AV/C commands with node A2 of bus A in accordance with the AV/C protocol standard in bus B checks the ID of the remote bus in which a bus reset has occurred, and confirms that the remote bus is bus A to which node A2 as a communication destination is connected. Then, node B2 recognizes that the communication destination node, i.e., node A2 has started a bus reset process according to the AV/C protocol standard.

Node B2 also executes a process corresponding to the AV/C bus reset process shown in FIG. 29, and a process for determining an AV/C command, which was output before the remote bus reset and a response to which is not received yet, to be aborted before execution. In this manner, consistency of the AV/C protocol process can be assured between node A2 that has started the bus reset process upon generation of a bus reset in practice, and node B2 which is connected to bus B where no bus reset occurs.

That is, node B2 resends an AV/C command shown in (3) in FIG. 29 to node A2, and node A2 sends an AV/C response shown in (4) in FIG. 29 in response to that command, thus proceeding with a communication.

As described above, according to this embodiment, a desired event can be generated in a specific one of devices connected using the IEEE1394 bus independently of the types of higher level protocols. With this event, the user can easily specify a device, manage power supply management, and so forth.

[Second Embodiment]

The second embodiment according to the present invention will be described in detail below with reference to FIG. 31. The basic arrangement of the second embodiment is the same as that in the first embodiment, and event information is written in an EVENT_CONTROL register of each 1394 node. In the second embodiment, however, control for the written event information slightly differs. Differences from the first embodiment mentioned above will be mainly explained below.

Figure 31:
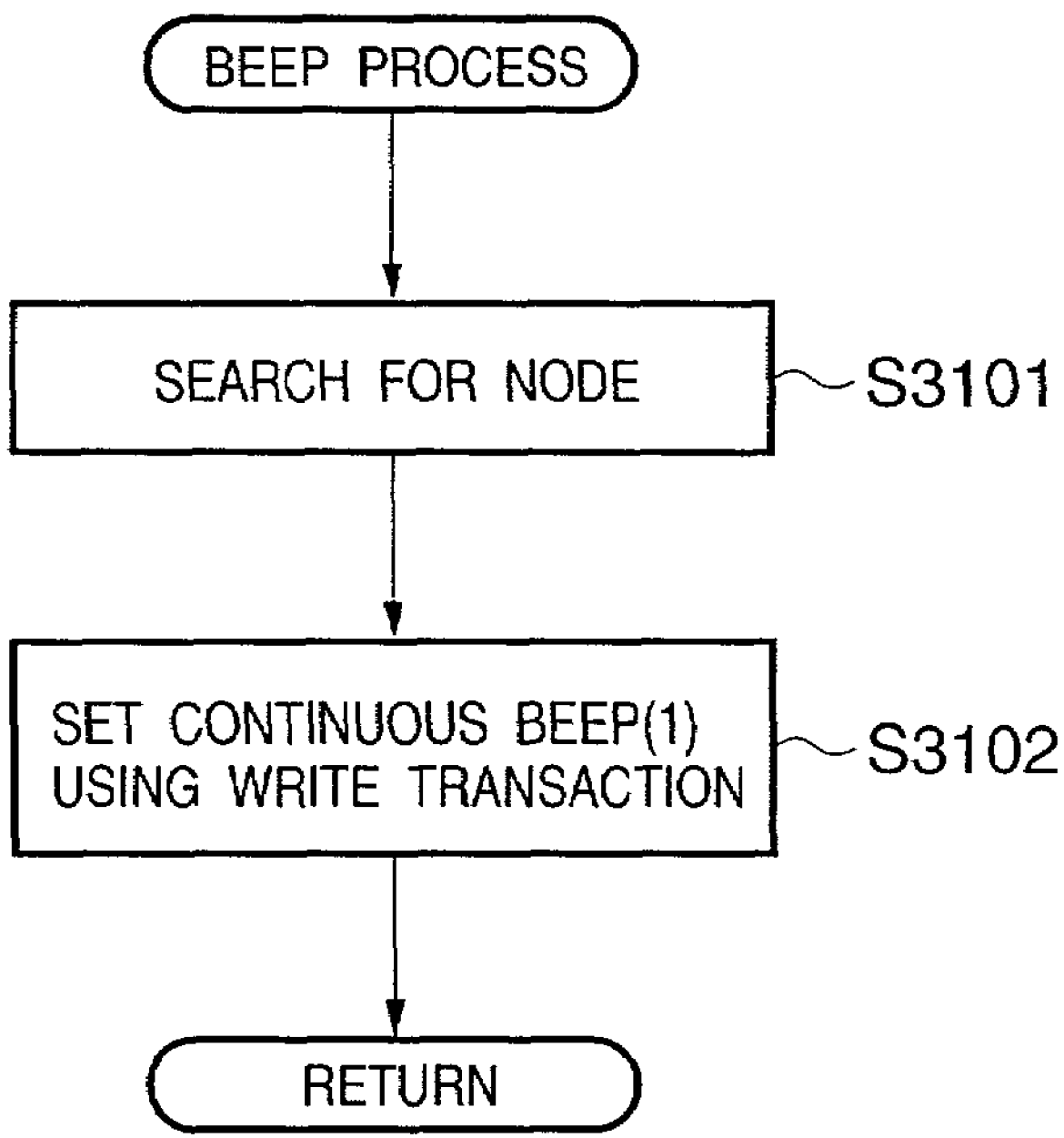
FIG. 31 is a flow chart for explaining a process for setting BEEP in the EVENT_CONTROL register of the 1394 node according to the second embodiment of the present invention.

FIG. 31 is a flow chart for explaining a process for writing "BEEP" in the EVENT_CONTROL register of each 1394 node and controlling the designated device to beep in the second embodiment of the present invention. A process for searching for a specific device, writing "BEEP" in the EVENT_CONTROL register of that device (1394 node), and controlling the designated device to beep in the second embodiment will be described below with reference to FIG. 31.

In step S3101, a device (1394 node) in which "BEEP" is to be written and which is controlled to beep is searched for. In this process, a desired device can be searched for by reading information inherent to each node stored in the configuration ROM, i.e., information indicating a device such as a printer, scanner, or the like from the configuration ROM, as has been explained in the paragraphs of the instance directory in FIG. 24.

Furthermore, in order to extract a specific device from devices of an identical type, a specific device of a specific vendor can be selected from devices of an identical type on the basis of the node unique ID (1001 in FIG. 10) stored in the configuration ROM.

If the specific device is found in step S3101, the flow advances to step S3102, and "1" is written in event information "BEEP" shown in, e.g., FIG. 30 in the EVENT_CONTROL register of the found device using 1394 write transaction so as to control the found device to beep. With this write, the written device recognizes that "BEEP" is instructed, and executes an event instructed by "BEEP". This event can inform the user of the location of that specific device.

In the above description, the device is controlled to beep based on "BEEP". Also, the same applies to a case wherein the device is controlled not to beep based on "BEEP", or event control using "LIGHT" and "POWER", except for operations of the device.

Operations associated with "BEEP" are not limited to those shown in FIG. 30, but may use a display of a device connected to the network.

As described above, according to the second embodiment, a system which allows a specific one (device) of nodes connected to the IEEE1394 bus to execute a specific event independently of higher level protocols can be provided.

Furthermore, an information signal processing apparatus which is characterized in that the predetermined registers are allocated in a core CSR architecture register space in an address space of each 1394 node or in a serial bus register space of the address space can be provided.

[Another Embodiment]

In the present invention, information is written in the register using write transaction but may use lock transaction.

As described above, according to the preferred embodiments of the present invention, a desired event can be generated in a specific one of devices connected using a communication control network (e.g., an IEEE1394 bus) independently of the types of higher level protocols. With this event, for example, the user can easily specify a device, manage power supply management, and so forth.

Note that the objects of the present invention are also achieved by supplying a program code of software that can implement the functions of the above-mentioned embodiments to a system or apparatus, and reading out and executing the program code by a computer (or a CPU or MPU) of the system or apparatus. In this case, the program code itself implements the functions of the above-mentioned embodiments, and a program product such as a storage medium which stores the program code and the like constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

The present invention is not limited to the IEEE1394 bus, but may be similarly applied to other buses, e.g., a bus called USB.

As many apparently widely different embodiments of the present invention can be made without departing from the spirit and scope thereof, it is to be understood that the invention is not limited to the specific embodiments thereof except as defined in the claims.

What is claimed is:

1. An information signal processing apparatus connected to a connection control network, comprising:
    event reception means for receiving a predetermined event instruction irrespective of a type of high level protocol by using predetermined addresses as registers, which are allocated in a serial bus register space in an address space of said information signal processing apparatus connected to a communication control bus complying with IEEE 1394;
    event generating means for generating an event corresponding to the received instruction when said event reception means receives an event instruction;
    detecting means for detecting generation of a bus reset on a remote bus connected to said communication control bus via a bridge by referring to a part of said predetermined addresses which is used for indicating bus reset status on the remote bus; and
    informing means for informing a high level protocol layer of generation of a bus reset on the remote bus when said detecting means detects the generation of the bus reset,
    wherein said apparatus does not execute a bus reset process on said communication control bus when said detecting means detects generation of a bus reset on the remote bus, and
    said high level protocol layer re-establishes a connection with a node connected to the remote bus when said informing means informs said high level protocol layer of the generation of the bus reset on the remote bus while said high level protocol layer establishes a connection with the node.

2. The apparatus according to claim 1, further comprising event informing means for informing a user of the event.

3. The apparatus according to claim 1, wherein the event instruction includes one of an event instruction for controlling not to beep, an event instruction for controlling to continuously beep, and an event instruction for controlling to intermittently beep.

4. The apparatus according to claim 1, wherein the event instruction includes one of an event instruction for controlling not to emit light, an event instruction for controlling to continuously emit light, and an event instruction for controlling to flicker.

5. The apparatus according to claim 1, wherein the event instruction includes one of an event instruction for controlling not to execute power supply control, an event instruction for controlling to turn on a power supply, and an event instruction for controlling to turn off the power supply.

6. An information signal processing method in an information signal processing apparatus connected to a connection control network, comprising the steps of:
    receiving a predetermined event instruction irrespective of a type of high level protocol by using predetermined addresses as registers, which are allocated in a serial bus register space in an address space of said information signal processing apparatus connected to a communication control bus complying with IEEE 1394;
    generating an event corresponding to the received instruction;
    detecting generation of a bus reset on a remote bus connected to said communication control bus via a bridge by referring to a part of said predetermined addresses which is used for indicating bus reset status on the remote bus; and
    informing a high level protocol layer of the generation of the bus reset on the remote bus when the detecting steps detects the generation of the bus reset,
    wherein said apparatus does not execute a bus reset process on said communication control bus when generation of a bus reset on the remote bus is detected by the detecting step, and
    said high level protocol layer re-establishes a connection with a node connected to the remote bus when said high level protocol layer is informed of the generation of the bus reset on the remote bus while said high level protocol layer establishes a connection with the node.

7. The method according to claim 6, wherein a user is informed of the event.

8. The method according to claim 6, wherein the event instruction includes one of an event instruction for controlling not to beep, an event instruction for controlling to continuously beep, and an event instruction for controlling to intermittently beep.

9. The method according to claim 6, wherein the event instruction includes one of an event instruction for controlling not to emit light, an event instruction for controlling to continuously emit light, and an event instruction for controlling to flicker.

10. The method according to claim 6, wherein the event instruction includes one of an event instruction for controlling not to execute power supply control, an event instruction for controlling to turn on a power supply, and an event instruction for controlling to turn off the power supply.

11. A computer-readable program stored on a computer-readable medium, the program for making a computer connected to a connection control network function as:
    event reception means for receiving a predetermined event instruction irrespective of a type of high level protocol by using predetermined addresses as registers, which are allocated in a serial bus register space in an address space of the computer connected to a communication control bus complying with IEEE 1394;
    event generating means for generating an event corresponding to the received instruction when said event reception means receives an event instruction;
    detecting means for detecting generation of a bus reset on a remote bus connected to said communication control bus via a bridge by referring to a part of said predetermined addresses which is used for indicating bus reset status on the remote bus; and
    informing means for informing a high level protocol layer of the generation of the bus reset on the remote bus when said detecting means detects the generation of the bus reset,
    wherein the computer does not execute a bus reset process on said communication control bus when said detecting means detects the generation of the bus reset on the remote bus, and
    said high level protocol layer re-establishes a connection with a node connected to the remote bus when said informing means informs said high level protocol layer of the generation of the bus reset on the remote bus while said high level protocol layer establishes a connection with the node.

* * * * *

UNITED STATES PATENT AND TRADEMARK OFFICE
CERTIFICATE OF CORRECTION

PATENT NO. : 7,177,959 B2 Page 1 of 1
APPLICATION NO. : 09/816458
DATED : February 13, 2007
INVENTOR(S) : Fukunaga It is certified that error appears in the above-identified patent and that said Letters Patent is hereby corrected as shown below:

TITLE PAGE, ITEM
(57) Abstract, Line 6, "instructionis" should read -- instruction is --.

SHEET 7:
FIG. 7, under REGISTER NAME, "CLOCK_STOROBE_ARRIVED," should read -- CLOCK_STROBE_ARRIVED, --.

SHEET 30:
FIG. 30, "LIGTH" should read -- LIGHT --.

COLUMN 11:
Line 11, "relationship" should read -- relationships --.

COLUMN 16:
Line 34, "transferred)" should read -- transferred). --.

COLUMN 22:
Line 7, "have" should read -- has --.

Signed and Sealed this

Eighteenth Day of March, 2008

JON W. DUDAS
*Director of the United States Patent and Trademark Office*